(12) United States Patent
Saez et al.

(10) Patent No.: US 7,768,500 B2
(45) Date of Patent: Aug. 3, 2010

(54) ERGONOMIC POINTING DEVICE

(75) Inventors: Manuel Saez, Brooklyn, NY (US); Lachezar Tsvetanov, Bridgeport, CT (US); Maximo Diaz Heer, Jackson Heights, NY (US); Jonathan Puleio, Lattingtown, NY (US)

(73) Assignee: Humanscale Corporation, New York, NY (US)

( * ) Notice: Subject to any disclaimer, the term of this patent is extended or adjusted under 35 U.S.C. 154(b) by 1593 days.

(21) Appl. No.: 10/867,138

(22) Filed: Jun. 14, 2004

(65) Prior Publication Data

US 2005/0275621 A1 Dec. 15, 2005

Related U.S. Application Data

(60) Provisional application No. 60/478,886, filed on Jun. 16, 2003.

(51) Int. Cl.
G09G 5/08 (2006.01)
(52) U.S. Cl. .................. 345/163; 345/156; D14/402
(58) Field of Classification Search ......... 345/156–170, 345/172, 174–175; 248/118, 118.1, 118.3, 248/118.5; D14/402–408
See application file for complete search history.

(56) References Cited

U.S. PATENT DOCUMENTS

| | | | |
|---|---|---|---|
| 3,541,541 A | 11/1970 | Engelbart | |
| D302,426 S | 7/1989 | Bradley et al. | |
| 4,862,165 A | 8/1989 | Gart | |
| D328,597 S | 8/1992 | Clouss | |
| 5,157,381 A | 10/1992 | Cheng | |
| 5,260,696 A * | 11/1993 | Maynard, Jr. | ............... 345/163 |
| 5,726,683 A | 3/1998 | Goldstein et al. | |
| 5,754,168 A | 5/1998 | Maynard | |
| 5,870,081 A | 2/1999 | Wu | |
| 5,894,302 A | 4/1999 | Scenna et al. | |
| 6,031,522 A | 2/2000 | Strand | |
| 6,064,371 A | 5/2000 | Bunke et al. | |
| 6,072,471 A | 6/2000 | Lo | |
| 6,115,028 A * | 9/2000 | Balakrishnan et al. | ...... 345/157 |
| 6,157,370 A | 12/2000 | Kravtin et al. | |
| 6,369,797 B1 * | 4/2002 | Maynard, Jr. | ............... 345/163 |
| 6,373,468 B1 | 4/2002 | Leman | |
| 6,396,478 B1 | 5/2002 | Kravtin et al. | |
| 6,507,335 B1 | 1/2003 | Von Ilberg et al. | |
| 6,844,871 B1 * | 1/2005 | Hinckley et al. | ............ 345/163 |
| 2002/0084985 A1 | 7/2002 | Hesley et al. | |

FOREIGN PATENT DOCUMENTS

| | | |
|---|---|---|
| EP | 0 762 318 A2 | 3/1997 |
| EP | 0 964 355 A2 | 12/1999 |
| EP | 1 182 606 A2 | 2/2002 |
| WO | WO-00/60536 A1 | 10/2000 |

* cited by examiner

OTHER PUBLICATIONS

*The Hand*, (1985) vol. II, Chapter 53, pp. 497-401, W.B. Saunders Company.

*Primary Examiner*—Richard Hjerpe
*Assistant Examiner*—Mansour M Said

(57) ABSTRACT

An input device for a computer is described that positions the user's hand in a more ergonomically desirable position, i.e., at an angle of about 45° to the work surface. In preferred embodiments, the input device accommodates either a user's left or right hand, and in either case, positions the hand in an ergonomically desirable position. In another embodiment, the length of the input device of the present invention is adjusted for the size of the user's hand. In further embodiments, the input device of the present invention provides a palm rest. Other desirable features included in preferred embodiments include lateral buttons that are positioned one above the other.

32 Claims, 24 Drawing Sheets

ERGONOMIC POINTING DEVICE

CROSS-REFERENCE TO RELATED APPLICATION

This application claims the benefit of U.S. Provisional Application No. 60/478,886, filed Jun. 16, 2003.

FIELD OF THE INVENTION

The present invention relates to data input devices, and more particularly to a data input device that positions the user's hand in an ergonomically appropriate position to reduce the risk of repetitive motion injury. Further, the data input device is adapted to be used in both a right-hand and left-hand configuration.

BACKGROUND OF THE INVENTION

The torrent of technological innovation over the last 15 years has done little to change the way most people usually interact with their personal computers, which is generally by sitting in front of a keyboard, mouse and monitor.

The problem with the traditional method for a human interacting with their personal computer is that the human body is not suited to sitting for hours at a time, particularly while typing, pointing, clicking, and staring at an illuminated screen. This combination is further frustrated in that it can lead to muscle strain, fatigue and stress. Still, experts in ergonomics say there are several easy and effective ways in which computer users can improve their physical comfort, fight fatigue, and reduce the risk of injuries from repetitive motions.

Posture is one area in which minor adjustments can quickly yield benefits. Even at home, but especially in a more stressful environment like an office, users may force their bodies into rigid positions that result in fatigue and muscle strain. Maintaining what experts call optimal ergonomic positioning can increase energy level and improve overall comfort, although it may take a few weeks before the results are noticeable. Good posture keeps the spine in what health professionals call the neutral position.

One of the most common accessories for a personal computer (PC) is a mouse for translating motion of a user's hand into signals that an attached PC can use to move a cursor or pointer on a display. Computer mice can be found in a variety of physical embodiments. Typically, a mouse comprises a body that serves as a grip for the user's hand and as a structure for mounting a movement sensing system and two or more mouse buttons for selecting computer functions. Mice are available with electro-mechanical, opto-mechanical, or optical movement sensing systems. The electro- and opto-mechanical systems typically incorporate a ball arranged for rotation in the body and protruding from the bottom of the mouse into contact with the surface on which the mouse is resting. Movement of the mouse causes the ball to rotate. Electrical or optical transducers in the body convert the motion of the ball into electrical signals proportionate to the extent of movement of the mouse in x and y directions. The motion of the mouse can also be sensed with an optical system. One optical system requires a special mouse pad with grid lines on a reflective surface. As the mouse is moved over the grid, changes in the direction of reflected light are optically detected and transformed to electrical signals. Another mouse employs a digital camera to take periodic photographs of the surface on which the mouse is moved. A digital signal processor analyzes the series of images to determine the direction and extent of motion. Typically, the electrical signals generated by the movement sensing system are converted to a serial, digital data stream by a microprocessor in the mouse and sent to the computer over a cable or by infrared or radio frequency signaling. The computer uses the x and y movement data obtained from the mouse to repeatedly recalculate the position of the cursor on the display.

Most prior art mice have a generally horizontal, primary supporting surface for supporting a hand in a horizontal position, as exemplified by the drawing figures of U.S. Pat. No. 5,157,381 to Cheng, and the drawings in the user's manual of the Microsoft Mouse. However, such prior art mice force the hand, wrist, and forearm to be twisted 80 to 90 degrees out of their natural and relaxed positions, and require constant muscular force to be applied to the hand, wrist, and forearm to maintain their positions. For a three-button mouse, the fore, middle, and ring fingers must be kept in constant tension to prevent them from resting too heavily on the buttons and depressing them inadvertently. A horizontal hand holding a prior art mouse is supported on the desk by only a small area at the wrist on the little finger side, so that a pressure sore may develop thereon. The total effort and discomfort may not seem great at first, but when these mice are used over a prolonged and continuous period of time, users may get diseases associated with the use of the computer mouse (e.g. tendinitis, bursitis, and carpal tunnel syndrome) and experience fatigue, discomfort, and even pain in the hand and wrist.

As the use of a mouse has become more universal, ergonomics has assumed an increasing role in mouse design. For example, mice can be obtained that are designed for either right-handed or left-handed users.

U.S. Pat. No. 6,031,522 to Strand discloses an ergonomic mouse having a removable body shell. The shell fits over a base mouse that includes a movement sensing system and switches. Different shells can be installed on the base mouse to accommodate varying hand sizes, different handedness, or varying numbers of buttons for different computers, applications, or special user requirements. A mouse designed for either right- or left-handed use improves user comfort and efficiency and may reduce injuries related to mouse use. Such a mouse is acceptable and desirable if the computer has a single user. However, in a home environment, a computer may be used concurrently by a number of users of different handedness. Likewise, in libraries, schools, and other applications where computer use is shared, a mouse shaped for ambidextrous use is highly desirable, if not necessary.

U.S. Pat. No. 6,072,471 to Lo discloses an ambidextrous upright computer mouse having a relatively upright finger engaging side on one side and a thumb engaging side on the opposite side. Two sets of buttons are positioned at opposite ends of the finger engaging side. When the finger engaging side is on the right side, the mouse can be grasped by a right hand, and when the mouse is rotated so that the finger engaging side is on the left side, it can be grasped by the left hand. Only one set of buttons is enabled at any time, and the buttons are alternately enabled and disabled by moving a selector switch.

U.S. Pat. No. 6,373,468 to Leman similarly discloses a pointer device having an ergonomically contoured shell with a first set of one or more button tabs at a first end and a second set of one or more button tabs at a second end. The shell can be removably coupled to a base, and one or more switches are adapted to be activated by the first set of one or more button tabs when the shell is coupled to the base in a left-handed configuration and activated by the second set of one or more button tabs when the shell is coupled to the base in a right-handed configuration.

Standardization of the function associated with a particular mouse button is another ergonomic aspect of mouse design. One button is typically positioned for more convenient actuation by the index finger and a second button is positioned for actuation by the middle finger. Typically the cursor select function is assigned to the mouse button operated by the index finger because the function is the predominant function initiated by mouse operation. Standardization in function assignment increases the convenience of mouse operation and reduces learning time. However, standardization of function assignment presents a problem when a mouse is used by persons of different handedness. If a function is assigned to the left mouse button of a right-handed mouse (the button operated by the index finger of the right hand), a left-handed user of that mouse must actuate the button with the middle finger to obtain the same function. This operation may be awkward and is confusing if the user also operates a computer with a left-handed mouse. Computer operating systems typically provide for reassignment of functions for left- and right-handed mice. While this is useful in maintaining the desired relationship between the finger used to initiate the function for right-handed and left-handed mice, it increases user confusion if a mouse with an opposite button-function relationship is used. Further, many computer users may not be sufficiently familiar with the operating system to find and change the function-button relationship.

In addition to the movement sensing system, the mice are generally equipped with at least two mouse buttons for selecting and initiating computer functions. A mouse may be equipped with additional buttons, and mice are available with other forms of user input devices, such as finger operated rollers, that can be used to move a cursor in a displayed electronic document.

Typical computer mice, such as the one shown in U.S. Pat. No. D302,426 to Bradley et al., are substantially wider than they are tall, and have generally symmetrical sides so that they can be used by either the right or the left hand. Some mice are specially shaped for providing an optimal fit for a user's right hand. The mouse shown in U.S. Pat. No. D328,597 to Clouss, and sold under the trademark "MouseMan" by Logitech Inc. in Fremont, Calif., has a slightly angled but generally horizontal top surface for supporting the fingers and palm of a right hand. The Microsoft Mouse, Version 2, sold by Microsoft Corporation in Redmond, Wash., includes a concave left side for closely engaging the base of the thumb and palm of a right hand. The mouse shown in U.S. Pat. No. 4,862,165 to Gart includes a surface for supporting some fingers in substantially curled positions. Some ergonomic mice, including the Logitech MouseMan™, are also made in left-handed versions.

A detailed discussion of the "position of function" may be found in, for example, *The Hand* (1985) Vol. II, Chapter 53, pp. 497-501, published by W. B. Saunders Company, the disclosure of which is hereby incorporated by reference as though fully set forth herein. The position of function relates to the position of the hand at rest, which assumes a certain position. This is largely a mid-position of the range of motion of each and every joint, including the wrist, and rotation of the forearm. The forearm is halfway between pronation and supination. The wrist is in about 20° of dorsiflexion and 10° of ulnar flexion. The fingers are slightly flexed in each of their joints, the index being flexed least and the little finger being flexed the most. The thumb is forward from the hand in partial opposition and its joints are also partially flexed. A more precise description of the position of function can be made with regard to the thumb. In this position, the angle between the first and second metacarpal is about 45°. Each and every "position of function" must endeavor to bring together a number of favorable conditions that are not always compatible with each other. They are those that place the joints in a position in which grasp is easy, in which stiffness is less likely to occur, and, finally, in which eventual stiffness will permit preservation of movements of small aptitude, in a useful range. To that concept we add a concept from the medical field: a position of work used during a prolonged period constitutes a form of immobilization (in function). "There does not exist a 'position of function' in immobility; the function of the hand necessarily involves movement." *The Hand*, Vol. II, Chapter 53 at 501.

As noted previously, an attempt has been made in the prior art to address these concerns of form and function. U.S. Pat. No. 4,862,165 to Gart discloses a mouse having an arched metacarpalphalangeal support surface for supporting the anterior surface of the hand and a concave thenar pad support surface for supporting the thenar pad of the hand.

U.S. Pat. No. 5,726,683 to Goldstein et al. discloses a mouse having a top surface, a right side surface, and a substantially vertically rising left side surface. The top surface has a negative slope from front to rear in a range of 15°-30° and from left to right in a range of 20°-30°, and provides at the front of the top surface a phalanx support. The top surface includes a peak running from front to back oriented to lie under the operator's thenar eminence providing support thereto and a surface through which the operator can push the mouse with his or her thenar eminence.

U.S. Pat. No. 5,894,302 to Scenna et al. discloses a mouse including an upper surface having a hump for supporting the triangular area of the hand encircled by the thenar region, the hyperthenar region, and the region below the metacarpalphalangeal joints. The upper surface includes a tail having a rising portion to underlie and bear the pressure of the region of the user's hand where the thenar and hyperthenar converge. The finger buttons in the front are elevated above the hump.

By way of further background, a reported cause of carpal-tunnel syndrome is improper use of a computer mouse pointer. With a conventional mouse the users can develop bad habits that may predispose them to development or aggravation of carpal-tunnel syndrome. These bad habits can include using excessive wrist angles to position the mouse pointer instead of using the forearm and fingers, such as placing the wrist flat on the desk surface with the wrist bent back at an angle greater than fifteen degrees, and pronation (inward rotation) of the wrist past a normal angle with fingers spread to reach around the mouse body and then gripping the mouse tightly. With the hand in any of these positions, finger motion (clicking) is believed to potentially irritate the tissues and nerves in the carpal-tunnel. Indiscriminate use of wrist or arm braces can exacerbate the effects.

There have been several attempts to solve these problems. Mice have been designed with palm knobs and enlarged square ends. These designs, however, aggravate the above identified problems. The thumb and ring finger are brought into constant contraction and require the continual extension of the index and middle fingers over the activating buttons causing stress of the tendons in the forearm. As with other mouse designs, the ring finger is necessarily placed on the side of the mouse, leading to the myriad of problems outlined above.

Additionally, pronation of the hand is increased. By elevating the palm, the left stretch of the forefinger is increased and more reach is required thereby necessitating increased pronation. While these designs may provide some hand support, there is no finger extensor relief and they restrict fine finger control.

Heretofore, most hand operated data input devices have forced the user to position his/her hand in a position that is substantially parallel to the work surface. It has now been discovered that such a position places the user's hand at risk for a repetitive motion injury. Instead of a position that is substantially parallel to the work surface, it has now been discovered that the risk of injury is lessened if the hand is placed in supernated position at any angle up to an angle of about 90°. However, an angle of about 45° with the work surface appears to be the optimum.

SUMMARY OF THE INVENTION

In view of the foregoing disadvantages inherent in the known types of computer mouse apparatus now present in the art, the present invention relates to an improved ergonomic pointing device that in one embodiment includes a computer mouse.

Neutral hand posture, also known as the position of "repose," is the most relaxed and unstrained position for the hand. In this position, little muscle activity is present in the hand, wrist or forearm. The position of repose for the hand is with fingers slightly cupped and a little splayed, with the thumb forming a "C" shape with the index finger. The amount of pronation varies within individuals but should be in the range of 10 degrees to 45 degrees from the horizontal. This position is easily observed in a weightless environment, for example, while the hand is relaxed and suspended in a bath or swimming pool.

Accordingly, the data input device of the present invention provides a new and improved ergonomic computer mouse which places the hand in as near a state of repose as possible while manipulating the mouse and simultaneously improves finger mobility. The shape of the improved ergonomic mouse reduces several of the known high risk postures during mouse use and allows the continual shifting of postures so as to reduce the effect of continuous repetitive motion due to the unloading of vulnerable muscles, joints and tendon groups. This shape also provides a resting position for the hand, reducing stress in wrist extensors and finger extensors.

The shape of the improved ergonomic mouse is such that the pronation of the wrist and hand can be reduced from zero degrees from the horizontal, wherein the plane defined by the face of the operator's palm is nearly parallel to the surface the mouse is resting upon, to approximately 80 degrees from the horizontal, wherein the same plane is nearly perpendicular to the surface upon which the mouse rests. This shape, which allows the reduction of pronation, also allows the hand, and the entire forearm to rest on the desk surface thereby alleviating the pressure usually exerted on the wrist. Shoulder abduction and contraction of the shoulder muscles are minimized and the forearm muscles responsible for pronation may be relaxed entirely. The shape allows the fingers to curl comfortably and be supported rather than requiring the finger extensors to be held in a constant state of contraction, thus reducing the tension of the tendons.

The improved ergonomic mouse raises and supports the fingers (medial phalanx support) under the index finger joint (knuckle) and slopes away toward the little finger. The improved ergonomic mouse incorporates two negative slopes over approximately the rear two thirds of the mouse. One slopes the mouse down longitudinally from front to back and the other slopes the mouse laterally from side to side. The negative lateral slope may be from left to right or from right to left depending on whether the mouse is for a left- or right-handed user. The two negative slopes provide a small rear right corner which allows for a low approach while still supporting the fingers at the proximal phalanges. This low approach, combined with the 20 degrees to 30 degrees lateral elevation, reduces the stress of supporting the wrist in a position of extension. The negative slope from the left side to the right side also improves the grip and reduces pronation. This support cups the fingers into a naturally unstressed position, a position which is very similar to natural hand posture which is readily observed when resting the forearm on a desk surface. By allowing this shape to be maintained in all grip positions the fingers are allowed to actuate the buttons in a trigger finger action rather than levering the metacarpophalangeal joint (knuckle). This is quite different from the usual mouse designs which raise the palm of the hand and force simultaneous extension and contraction of the finger extensors.

The improved ergonomic mouse incorporates several unique features that aid in reducing the stress of the fingers and wrist. For the thumb there is a contoured smooth surface extending from the forward bottom section of the mouse to the top of the phalanx support. This allows the user to change grips from the normal position or with the hand resting on the mouse to the most comfortable grip wherein the operator's hand is rested on its side (on little finger) and cupping the mouse in a supported resting posture on the desk surface. The mouse or other surface can still be used in the usual manner with the wrist resting on the desk and the fingers achieving the mouse movements. This usage is still better than the normal mouse.

The present invention is directed to a pointing device that improves upon the prior art with a unique combination of features and new modifications to provide increased comfort to the user. The invention does so by providing a pointing device that supports the user's hand to avoid extreme positions of posture ranges of the wrist and the fingers and joints of the hand such as, for example, wrist extension, full pronation of the hand, and abduction or adduction of the thumb. The device is further configured to reduce pressure applied to the carpal tunnel, and to minimize contact pressure on the sensitive areas of the wrist by elevating it above the working surface. As a result, the pointing device tends to promote more relaxed hand and wrist posture, minimize static muscle loading, and reduce physical stresses during operation of the pointing device.

In accordance with one aspect of the invention, a pointing device for use on a working surface includes a bottom configured to be placed on the working surface, and at least one finger-operated pointing member. In a specific embodiment, the pointing device is a computer mouse device.

The device includes an upper surface having a crown for contacting a palmar region of the palm of the hand of a user substantially at the metacarpal-phalangeal (MP) joint of the second digit and desirably at least a portion of the MP joint of the third digit. The crown is higher in elevation than remaining portions of the upper surface relative to the bottom. Because one of the more repetitive tasks in operating the device entails pressing buttons using the second and/or third digits which involves movements mainly around the MP joints of those digits, the crown advantageously provides primary support from those MP joints toward the wrist.

The upper surface extends from the crown downwardly in a forward direction toward the tips of the second and third digits to form a front region, downwardly in a rearward direction toward the wrist of the user to form a back region, downwardly in an inward direction toward the thumb to form an inside region, and downwardly in an outward direction toward the MP joints of the fourth and fifth digits to form an outside region. A transverse hump extends from the crown in the outward direction for contacting a palmar region substantially at the MP joints of the fourth and fifth digits (and possibly a portion of the MP joint of the third digit). The transverse hump slopes downwardly from the crown to guide the hand away from full pronation. The back region supports the hypothenar region of the hand.

The crown and the back region preferably are sufficiently high relative to the bottom to maintain the wrist above the working surface to promote a near-neutral wrist position with little or no wrist extension, and to minimize contact pressure against sensitive areas of the wrist due to prolonged contact with the working surface.

The back region slopes downwardly with a sufficiently large curvature in the rearward direction to substantially avoid contacting the carpal tunnel region of the palm, thereby reducing pressure on the carpal tunnel. For example, the back region is typically configured to avoid contacting at least the middle and proximal portions of the carpal tunnel but may contact the distal portion of the carpal tunnel. In a specific embodiment, the back region has a greater curvature in the rearward direction than the front region in the forward direction.

The back region includes a "thenar void" to substantially avoid supporting the thenar region, so that the thumb is allowed to hang down in a substantially neutral thumb position and to move freely relative to the pointing device. This eliminates pressure and loading on the thenar region due to interference from a thenar support found in conventional mouse devices.

The crown and the back region desirably are sufficiently high in elevation to allow the distal phalange of the thumb to rest on the working surface in a rest position between the extreme positions of adduction and abduction. In a specific embodiment, the thumb is about halfway between adduction and abduction.

The front region may include buttons on which to place the second and third digits. The buttons are desirably aligned with the phalanges of the second and third digits, respectively. In this way, the digits can operate the buttons efficiently by pressing downward in a substantially neutral position without awkward or strained movements (i.e., abduction or adduction).

In some embodiments, the housing includes an inner side surface on which to place the thumb, and an outer side surface on which to place the fifth digit and possibly the fourth digit. The inner side surface includes an upper region with an inverted surface portion to face downwardly toward the distal phalange of the thumb. The outer side surface includes an upper region with an inverted surface portion to face downwardly toward the distal phalange of the fifth digit (and possibly the distal phalange of the fourth digit). The inverted surface portions provide convenient contact locations for the thumb and the fifth digit (and possibly the fourth digit) to lift the pointing device, thereby reducing the gripping or pinching force when the mouse is lifted. The device desirably has a center of gravity disposed between the inverted surface portion of the inner side surface and the inverted surface portion of the outer side surface. In this way, the device will remain level without tilting in the front-to-back direction during lifting by the hand.

The present invention provides an orthopedic computer mouse which can be translated over a support surface, the mouse adapted for supporting the hand in the "position of function" or "physiological position." The form of the orthopedic mouse in accordance with the invention has been developed from an imprint of the human hand realized in the position of function. The mouse comprises a bottom surface, a forward end, a rear end, and opposite sides, and a generally hemispherical surface for supporting the fingers of a hand in a generally elevated orientation relative to the support surface with the little finger located at a first elevation and the index finger located at a second elevation higher than the first elevation relative to the bottom surface. The generally hemispherical surface is further adapted for supporting the hollow of the hand so that the hand rests at an angle of forty-five degrees with respect to the support surface (i.e. the table) and with respect to the forearm in semipronation (i.e. halfway between pronation and supination). The general hemispherical finger-supporting surface extends upwardly and laterally from one of the opposite sides. A thumb-supporting surface is provided for supporting the thumb of the hand, so that the mouse is securely gripped between the thumb and the fingers where the thumb supporting surface is disposed opposite the generally hemispherical finger-supporting surface without effort. The generally hemispherical finger-supporting surface and the thumb-supporting surface cooperate such that the hand is supported in the physiological position on the mouse. This aspect, which is an important part of the position of function, is the most characteristic quality of the human hand. The work of the hand in opposition is characteristic of humans and must be preserved at all costs.

In the preferred embodiment, the generally hemispherical surface merges into a hypothenar depression for supporting the hypothenar eminence of the hand, and a thenar depression for supporting the thenar eminence of the hand. Between the two eminences (thenar and hypothenar) exists a depression. Its corresponding and complementary form is shown with the eminence that we will call "posterior prolongation" and that is depicted in the appended drawings and described in greater detail below. A raised fork is disposed above the generally hemispherical surface for placing the fingers of the hand into a pincer position.

To position the user's hand in an ergonomically preferred position, the length of preferred embodiments of the data input device of the present invention is adjustable to accommodate the size of the user's hand. Preferred embodiments also support the user's hand in a position with an approximately 45° angle wrist pronation. It is also desired that embodiments of the present invention include a palm support, and more desired that the palm support is integrated into the data input device, and it is still further desired that the integrated palm support has a gel pad.

Other desired embodiments of the present invention include a scroll device. While the scroll may be a conventional scroll wheel, it is more desired that the scroll is responsive to x-y directional motion.

Typically, the data input device of the present invention includes circuitry that can process inputs from a right click, a left click, a scroll device, as well as from two sets of forward/back buttons. Desirably, in preferred embodiments of the data input device of the present invention, one set of forward/back buttons is positioned on each side of the data input device. It is further desired that the laterally positioned forward/back buttons are positioned one above the other to reduce the motions required to move the thumb from one to the other.

Embodiments of the data input device of the present invention include a communication link. In some embodiments the communication link includes a cable that connects the data input device to a CPU. In such embodiments, it is preferred that the data input device includes a rubber cable holder to minimize the risk of breaking the cable. In some other embodiments the communication link includes an optical transceiver that connects the data input device to a CPU. In still other embodiments the communication link includes a wireless transceiver that connects the data input device to a CPU.

In the data input device of the present invention, it is preferred that the motion sensor is an optical motion sensor instead of a mechanical or optical-mechanical motion sensor. However, wireless motion sensors of the type employed in digitizer tablets are also preferred.

BRIEF DESCRIPTION OF THE DRAWINGS

In accordance with the above, the present invention will now be described in detail with respect to the accompanying drawings.

DETAILED DESCRIPTION OF THE INVENTION

Referring now to the several views of the drawings, there is depicted a data input device in accordance with the present invention.

Figure 1:
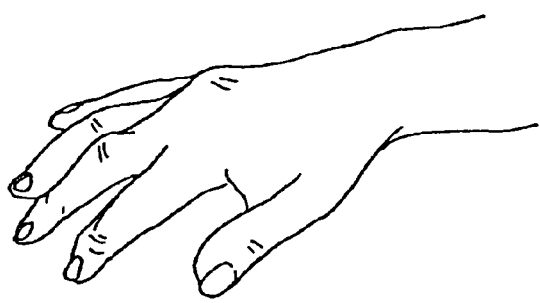
FIG. 1 is an illustration of the hand in the forced position (pronation) when using an ordinary mouse.
Figure 2:
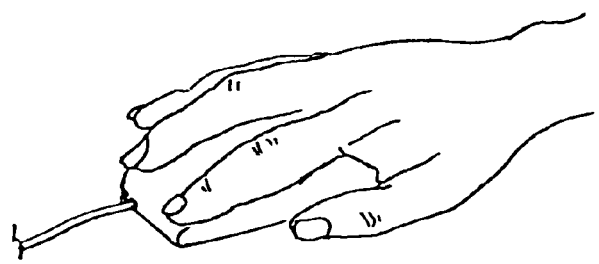
FIG. 2 is an illustration of the hand grasping an ordinary mouse in the forced position.
Figure 3:
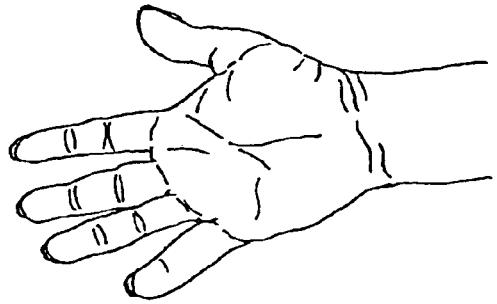
FIG. 3 is an illustration of the hand in the opposite position (supination) to that shown in FIG. 1.
Figure 4:
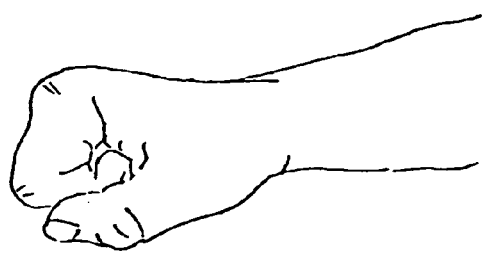
FIG. 4 is a view of the hand in flexion.
Figure 5:
FIG. 5 is a view of the hand in extension.
Figure 6:
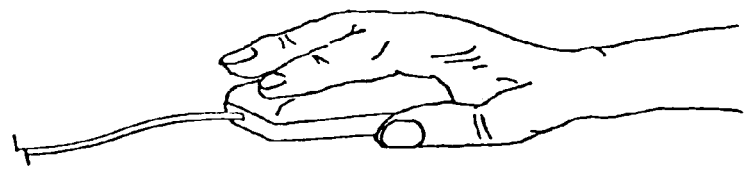
FIG. 6 is a view of the hand in extension when using an ordinary mouse.

FIG. 1 depicts the hand in pronation, the forced position which is used with an ordinary mouse (FIG. 2). FIG. 3 is the hand in supination, the opposite of the position shown in FIGS. 1 and 2. FIG. 4 shows the band in flexion, with effort of the flexor muscle groups. FIG. 5 depicts effort of the extensor muscle groups when the hand is in extension. FIG. 6 depicts use of an ordinary mouse with the hand extended.

Figure 7A:
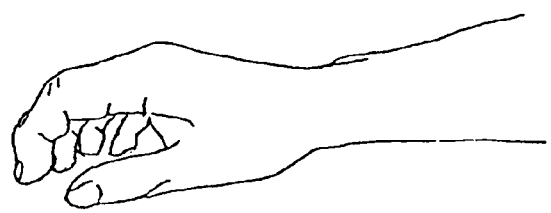
FIG. 7a is a view of the hand in the physiological position.
Figure 7B:
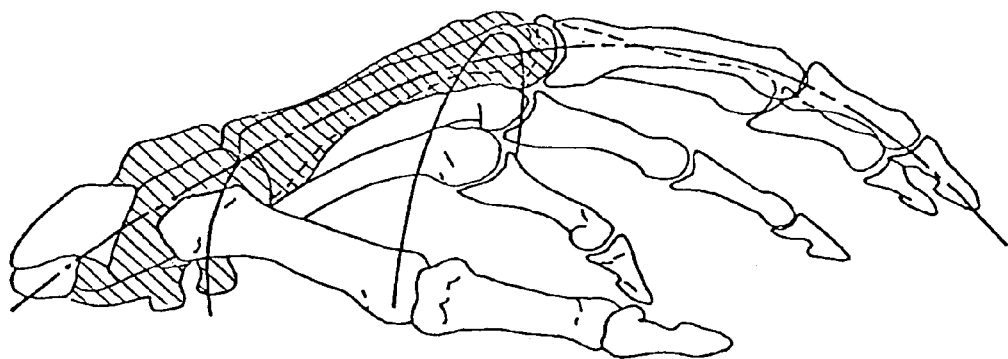
FIG. 7b is a view of the arches of the hand.
Figure 7C:
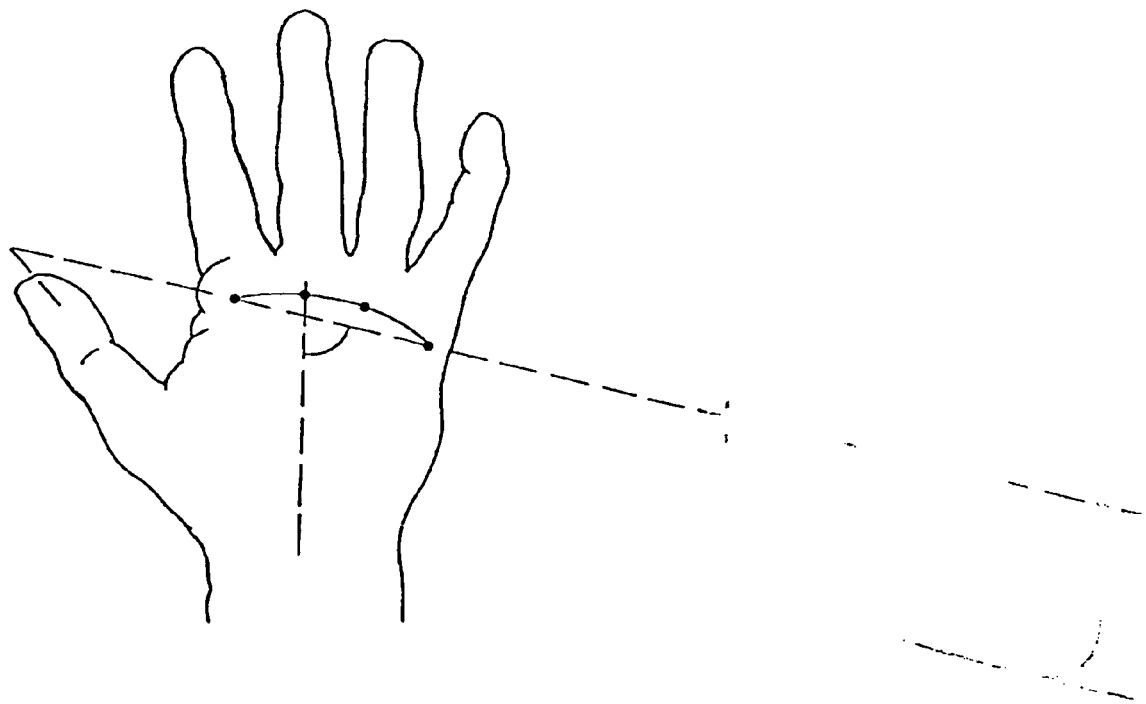
FIG. 7c is a view of the obliquity of the transverse axis of the palm.

FIG. 7a depicts the hand in the "physiological position" or "position of function." The "position of function" is discussed in *The Hand*, (1985) Vol. II, Chapter 53, pp. 497-501, published by W. B. Saunders Company, the disclosure of which is hereby incorporated by reference as though fully set forth herein. The skeleton of the hand has a transverse and longitudinal (i.e., double) concavity, which gives it the shape of a cup with a palmer concavity as depicted in FIG. 7b. It is essential to the grasping function of the hand that these concavities be preserved. The generally hemispherical surface ensures that the proper position will be maintained. As shown in FIG. 7c, the transverse axis lies obliquely, being more distal at the metacarpophalangeal joint of the index finger and more proximal at the metacarpophalangeal joint of the fifth finger. An angle of approximately 75 degrees is formed with the longitudinal axis, said angle also being present in the general shape of the present invention.

The position of function relates to the position of the hand at rest, which assumes a certain position. This is largely a mid-position of the range of motion of each and every joint, including the wrist, and rotation of the forearm. The forearm is halfway between pronation and supination. The wrist is in about 20° of dorsiflexion and 10° of ulnar flexion. The fingers are slightly flexed in each of their joints, the index being flexed least and the little finger being flexed the most. The thumb is forward from the hand in partial opposition and its joints are also partially flexed. A more precise description of the position of function can be made with regard to the thumb. In this position, the angle between the first and second metacarpal is about 45°. There are numerous ways to describe the "position of function" which may lead one to think that more than one "position of function" exists. *The Hand*, Vol. II, Chapter 53 at 494. Each and every "position of function" must endeavor to bring together a number of favorable conditions that are not always compatible with each other. They are those that place the joints in a position in which grasp is easy, in which stiffness is less likely to occur, and, finally, in which eventual stiffness will permit preservation of movements of small aptitude, in a useful range.

Figure 8:
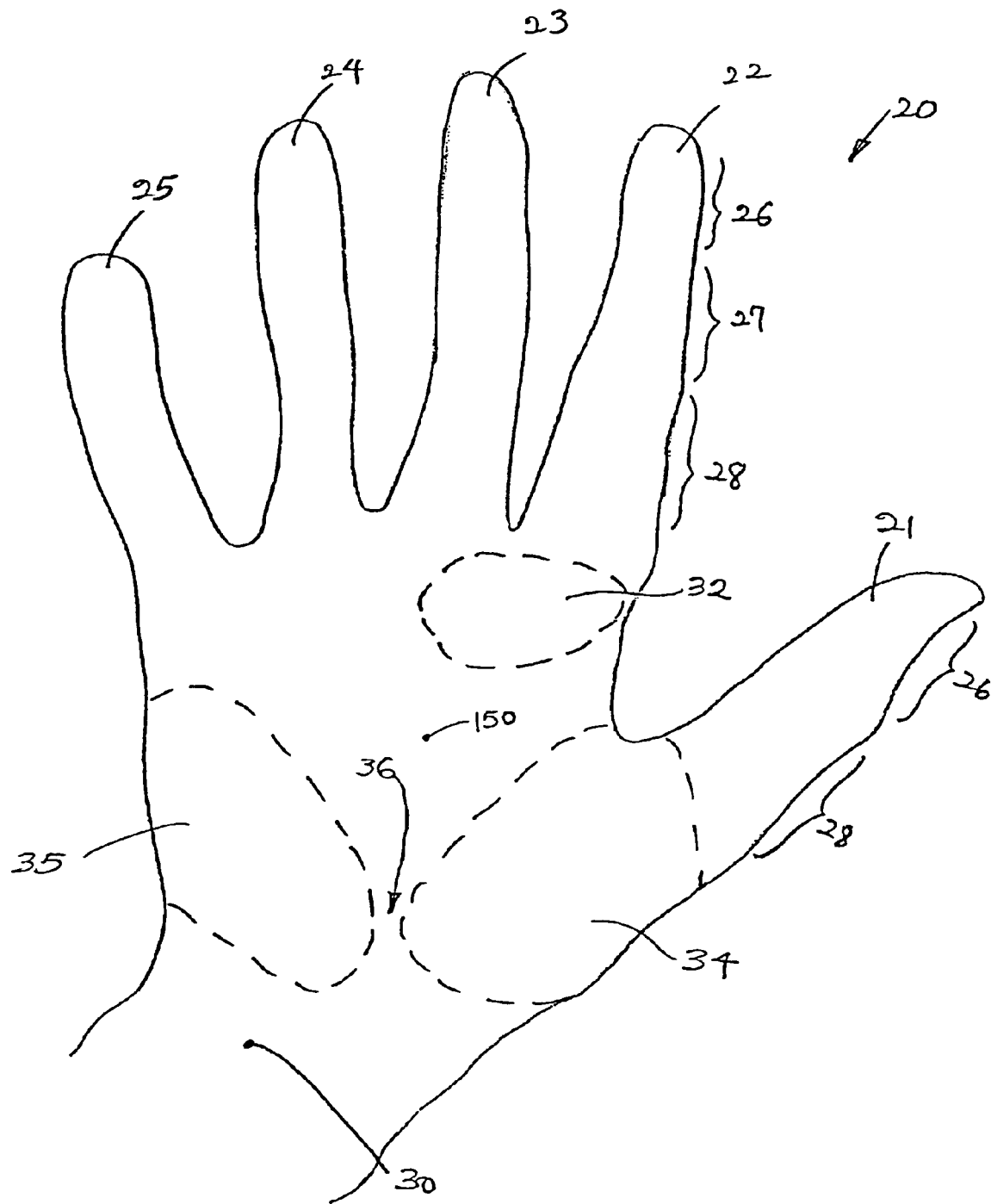
FIG. 8 is a schematic view of a hand illustrating the palm and surrounding regions.

FIG. 8 shows a right hand 20 having a first digit or thumb 21, second digit 22, third digit 23, fourth digit 24, and fifth digit 25. Each of the second through fifth digits 22-25 has three phalanges, including a distal phalange 26, a middle phalange 27, and a proximal phalange 28. The thumb 21 has a distal phalange 26 and a proximal phalange 28. The metacarpal and carpal bones extend between the five digits 21-25 and the wrist 30. The MP joints of the digits 21-25 are located between the proximal phalanges 26 of the digits 21-25 and the corresponding metacarpals. FIG. 8 shows a contact region 32 substantially at, typically just below, the MP joints of the second and third digits 22 and 23. More desirably, the contact region 32 is just below the MP joint of the second digit 22 and a portion of the MP joint of the third digit 23. The crown 16 of the mouse device 10 in FIGS. 1-7 is configured to contact and support the contact region 32 of the user's hand 20. Accordingly, the crown 16 is asymmetrically located inwardly to the left side of the upper surface 12 of the mouse 10.

As shown in FIG. 8, at the base of the thumb 21 is the thenar region 34, while on the other side of the palm is the hypothenar region 35. The carpal tunnel 36 is disposed between the thenar region 34 and hypothenar region 35.

Unlike prior art mice, which are held with a horizontal hand as shown in FIGS. 2 and 6 generally parallel to a desk, the mouse of the present invention is held with the hand in the physiological position in a generally upright, relaxed orientation.

Figure 9:
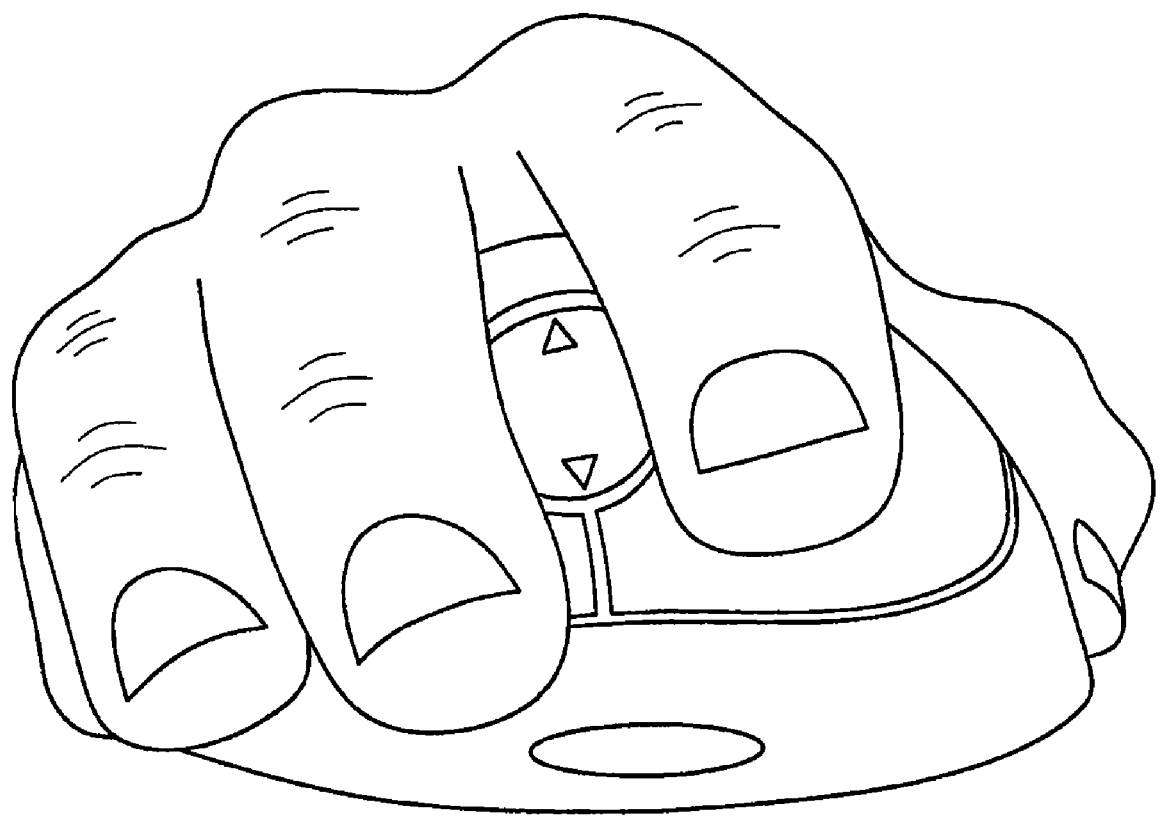
FIG. 9 shows a prior art mouse that puts a users right hand in an angle of about 45°.

FIG. 9 shows an art data input device designed to be used solely with the right hand. This device puts the user's right hand in an ergonomically desirable position. However, if the user were to attempt to use their left hand with this device, the user would have to put the left hand in a contorted and ergonomically undesirable position.

Figure 10:
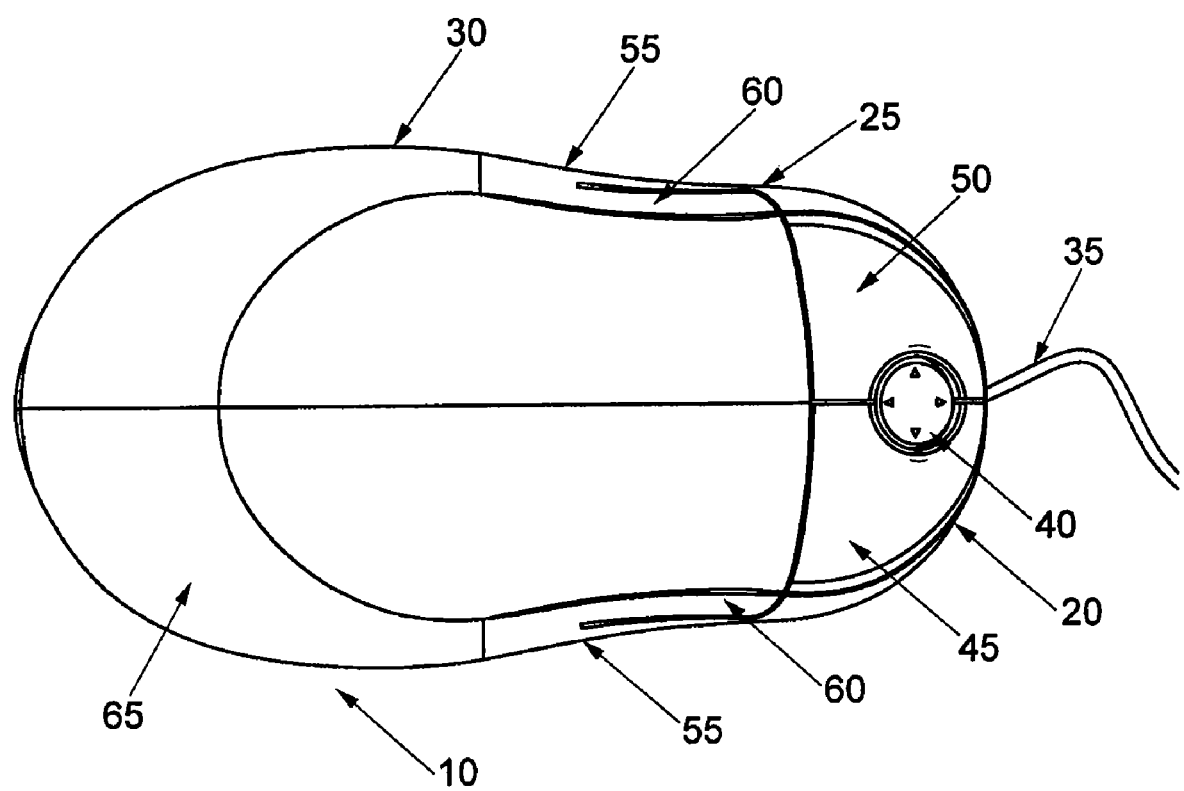
FIG. 10 is a top view of an ambidextrous ergonomic mouse according to a preferred embodiment of the present invention.

FIG. 10 is a top view of ambidextrous ergonomic mouse 10 according to a preferred embodiment of the present invention. As seen in FIG. 10, ambidextrous ergonomic mouse 10 has front portion 20 and rear portion 30. Front portion 20 has two buttons (a left and a right button) 50 and 45 as well as scroll device 40. Preferably, scroll device 40 is a scroll pad capable of directing movement in four directions, namely up, down, left, and right. Additionally, communication link 35 (illustrated as a cable according to the present embodiment) is seen attached to front portion 20. According to further embodiments, communication link 35 is a transceiver for wireless communication. Ambidextrous ergonomic mouse 10 according to this preferred embodiment of the present invention also has palm rest 65.

FIG. 10 also shows the preferred lateral buttons 55 and 60 on ambidextrous ergonomic mouse 10 with lateral button 60 positioned above lateral button 55.

Figure 11:
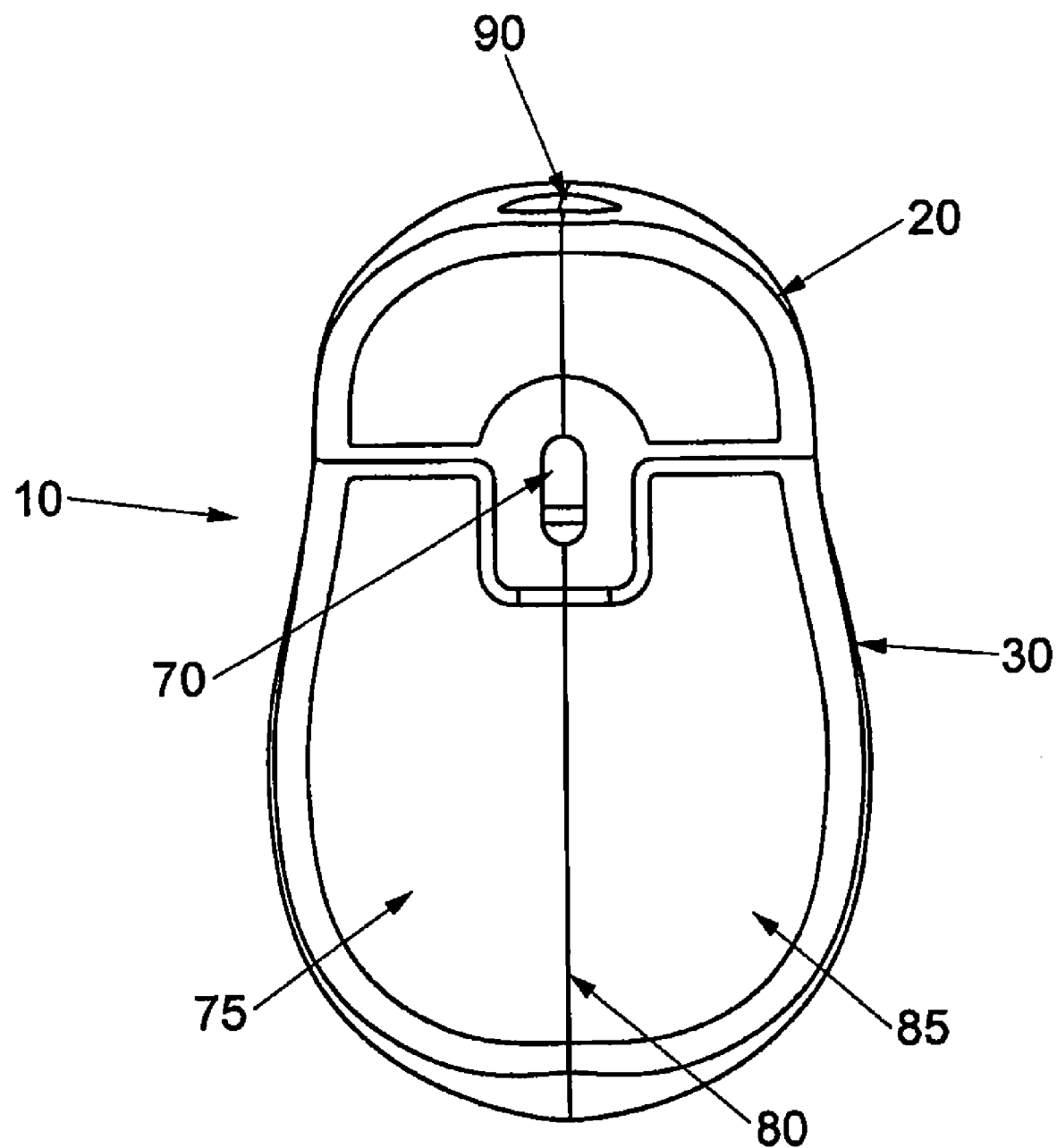
FIG. 11 is a bottom view of an ambidextrous ergonomic mouse according to a preferred embodiment of the present invention.

FIG. 11 is a bottom view of ambidextrous ergonomic mouse 10 according to a preferred embodiment of the present invention. As seen in FIG. 11, ambidextrous ergonomic mouse 10 has front portion 20 and rear portion 30. The bottom of ambidextrous ergonomic mouse 10 also has left bottom portion 85 and right bottom portion 75 which intersect along vertex 80. FIG. 11 also shows optical sensor 70 as used in this preferred embodiment as well as aperture 90, which is adapted for receiving communication link 35.

Figure 12:
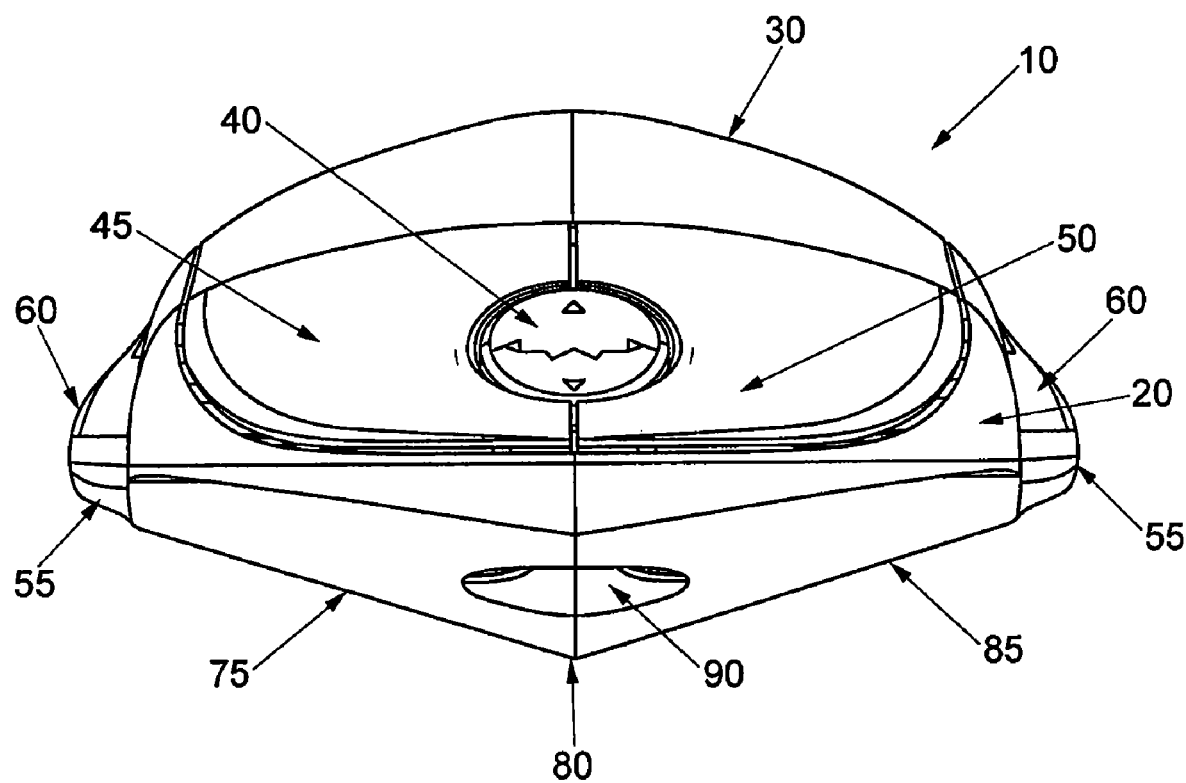
FIG. 12 is a front view of an ambidextrous ergonomic mouse according to a preferred embodiment of the present invention.

FIG. 12 is a front view of ambidextrous ergonomic mouse 10 according to a preferred embodiment of the present invention. As seen in FIG. 12, ambidextrous ergonomic mouse 10 has front portion 20 and rear portion 30. Front portion 20 has two buttons (a left and a right button) 50 and 45 as well as scroll device 40. Additionally, communication link aperture 90 is seen in this embodiment at front portion 20. Left bottom portion 85, right bottom portion 75 and vertex 80 can also be seen in this view of a preferred embodiment of ambidextrous ergonomic mouse 10 of the present invention.

FIG. 12 also shows the preferred lateral buttons 55 and 60 on ambidextrous ergonomic mouse 10 with lateral button 60 positioned above lateral button 55.

Additionally, FIG. 12 shows left bottom portion 85 and right bottom portion 75 which intersect along vertex 80 on the bottom of ambidextrous ergonomic mouse 10.

Figure 13:
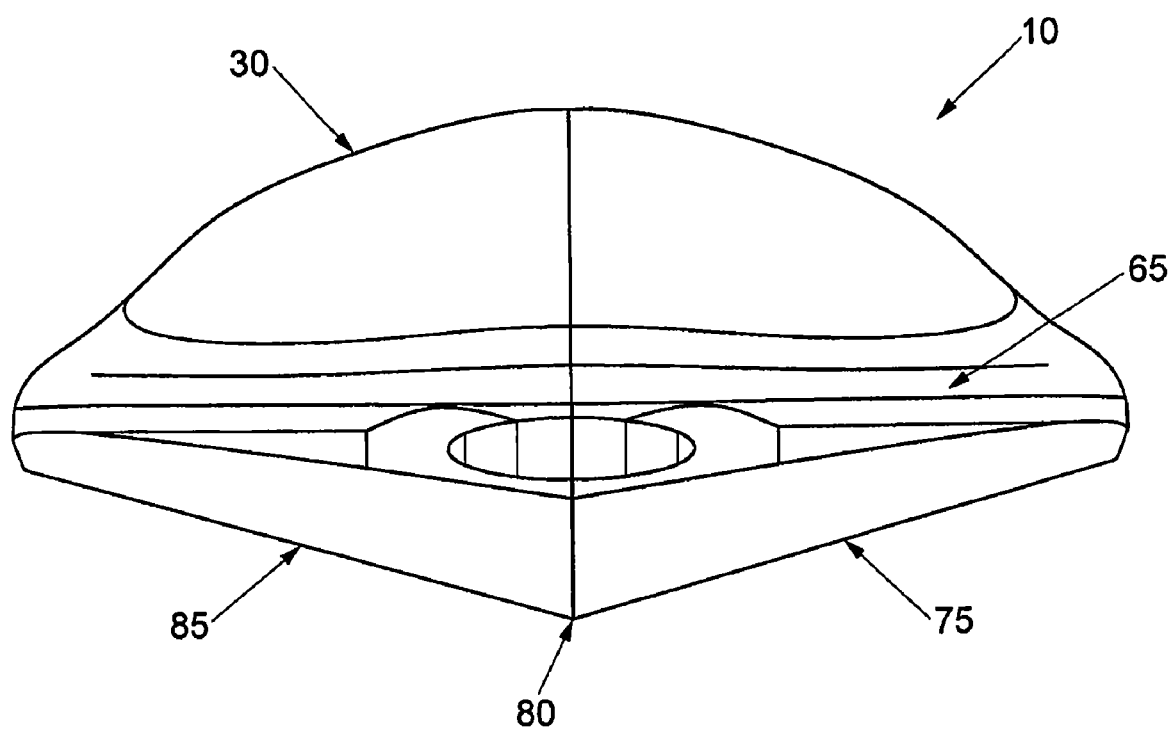
FIG. 13 is a rear view of an ambidextrous ergonomic mouse according to a preferred embodiment of the present invention.

FIG. 13 is a rear view of ambidextrous ergonomic mouse 10 according to a preferred embodiment of the present invention. Rear portion 30 of ambidextrous ergonomic mouse 10 of this preferred embodiment has palm rest 65. Left bottom portion 85, right bottom portion 75 and vertex 80 can also be seen in this view of a preferred embodiment of ambidextrous ergonomic mouse 10 of the present invention.

As can be seen in FIG. 12 and FIG. 13, the bottom of ambidextrous ergonomic mouse 10 is preferentially V-shaped with vertex 80 defining the point where left bottom portion 85 and right bottom portion 75 intersect. Such point of intersection is preferentially at an angle of about 120° to about 175°, and more preferentially at an angle of about 130° to about 150°. Accordingly, vertex 80 substantially prevents ambidextrous ergonomic mouse 10 of the present invention from resting flush on a flat surface in a substantially horizontal orientation (with respect to a horizontal axis of ambidextrous ergonomic mouse 10). Rather, vertex 80 acts as a pivot point encouraging either a left or right tilt of ambidextrous ergonomic mouse 10 such that when resting on a flat surface, ambidextrous ergonomic mouse 10 is resting on either left bottom portion 85 or right bottom portion 75. Accordingly, when resting on right bottom portion 75, ambidextrous ergonomic mouse 10 is in a most favorable ergonomic right-handed position. Similarly, when resting on left bottom portion 85, ambidextrous ergonomic mouse 10 is in a most favorable ergonomic left-handed position.

It is preferred that the V shape of the bottom of ambidextrous ergonomic mouse 10 comprise an angle whereby when resting on left bottom portion 85 or right bottom portion 75, ambidextrous ergonomic mouse 10 is tilted at an angle that substantially supports the user's hand in the physiological position. Preferably, the V shape bilaterally encourages a tilt of about 15° to about 80°, more preferably about 30° to about 60°, even more preferably about 45°. The present invention also envisions embodiments wherein the V shape is such that the degree of tilt is greater to one side than to the other.

Figure 14:
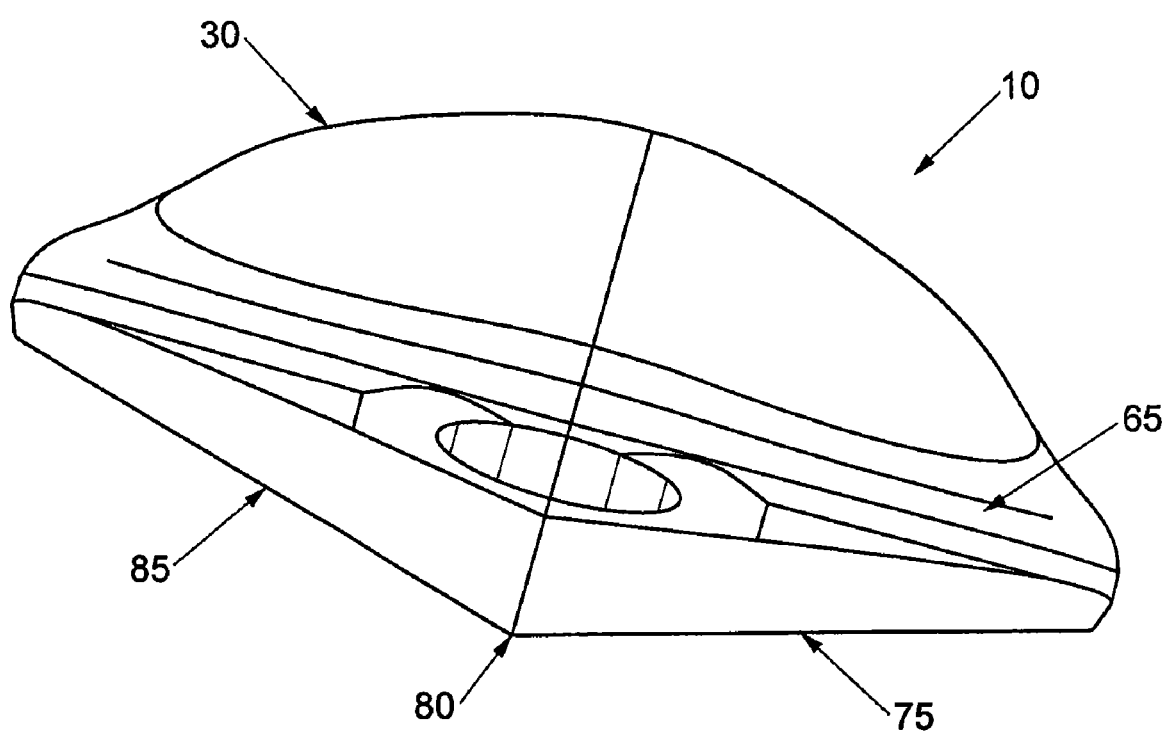
FIG. 14 is a rear view of an ambidextrous ergonomic mouse according to a preferred embodiment of the present invention in a right-handed position.

FIG. 14 is a rear view of ambidextrous ergonomic mouse 10 according to a preferred embodiment of the present invention in a right-handed position. As with FIG. 13, this figure shows rear portion 30 of ambidextrous ergonomic mouse 10 of this preferred embodiment with palm rest 65. Left bottom portion 85, right bottom portion 75 and vertex 80 can also be seen in this view of a preferred embodiment of ambidextrous ergonomic mouse 10 of the present invention.

Figure 15:
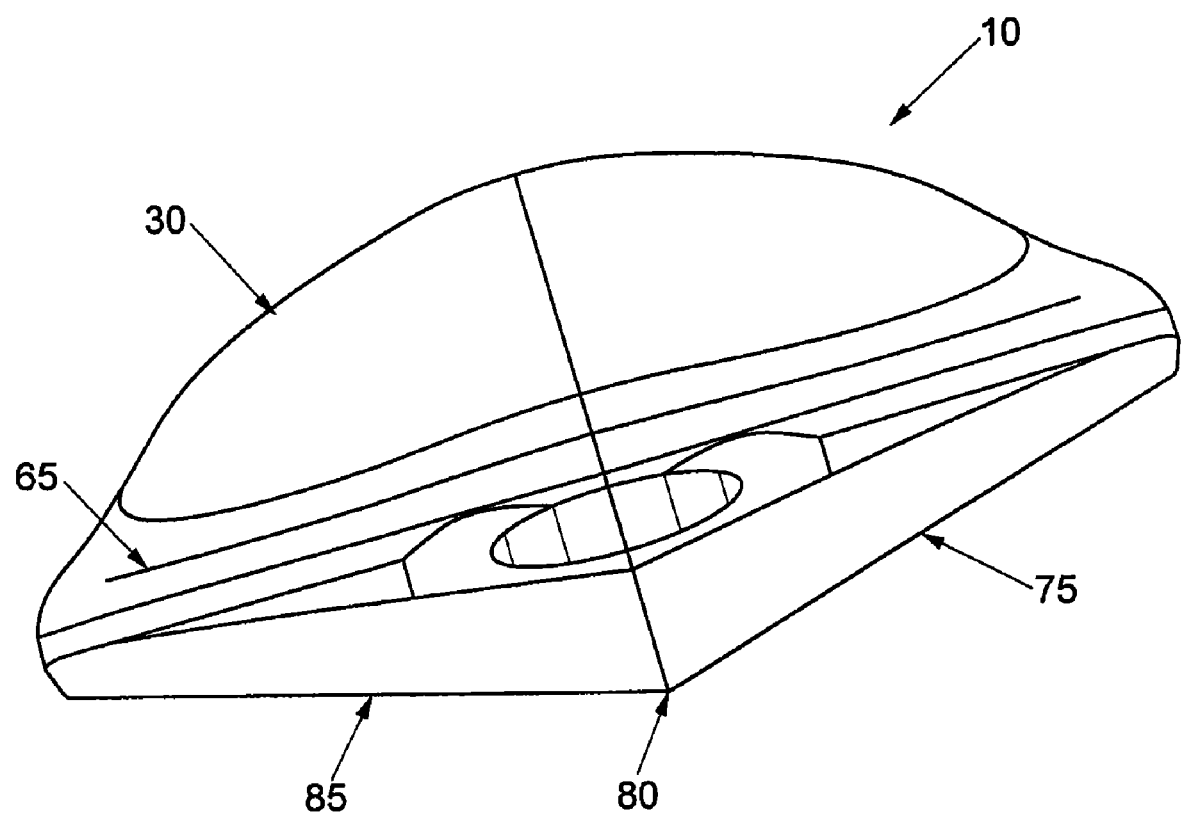
FIG. 15 is a rear view of an ambidextrous ergonomic mouse according to a preferred embodiment of the present invention in a left-handed position.

FIG. 15 is a rear view of ambidextrous ergonomic mouse 10 according to a preferred embodiment of the present invention in a left-handed position. As with FIGS. 13 and 14, this figure shows rear portion 30 of ambidextrous ergonomic mouse 10 of this preferred embodiment with palm rest 65. Left bottom portion 85, right bottom portion 75 and vertex 80 can also be seen in this view of a preferred embodiment of ambidextrous ergonomic mouse 10 of the present invention.

Figure 16:
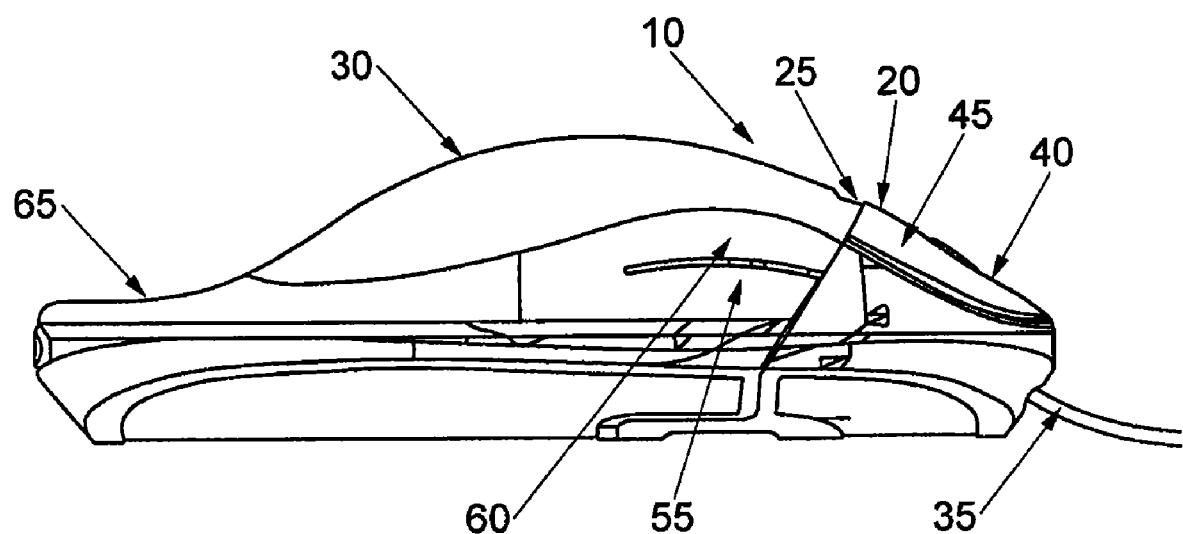
FIG. 16 is a side view of an ambidextrous ergonomic mouse according to a preferred embodiment of the present invention in a contracted position.

FIG. 16 is a right side view of ambidextrous ergonomic mouse 10 according to a preferred embodiment of the present invention in a contracted position. Desirably, the left side of ambidextrous ergonomic mouse 10 is substantially the mirror image of the right side.

As seen in FIG. 16, ambidextrous ergonomic mouse 10 has front portion 20 and rear portion 30. In the embodiment shown in FIG. 16, front portion 20 and rear portion 30 touch at intersection 25. Rear portion 30 of this preferred embodiment includes palm rest 65 as well as upper lateral button 60 and lower lateral button 55.

Also in the embodiment shown in FIG. 16, front portion 20 includes right button 45 and scroll device 40. Additionally, the embodiment shown in FIG. 16 illustrates communication link 35 connecting the mouse to a computer (not shown).

Figure 17:
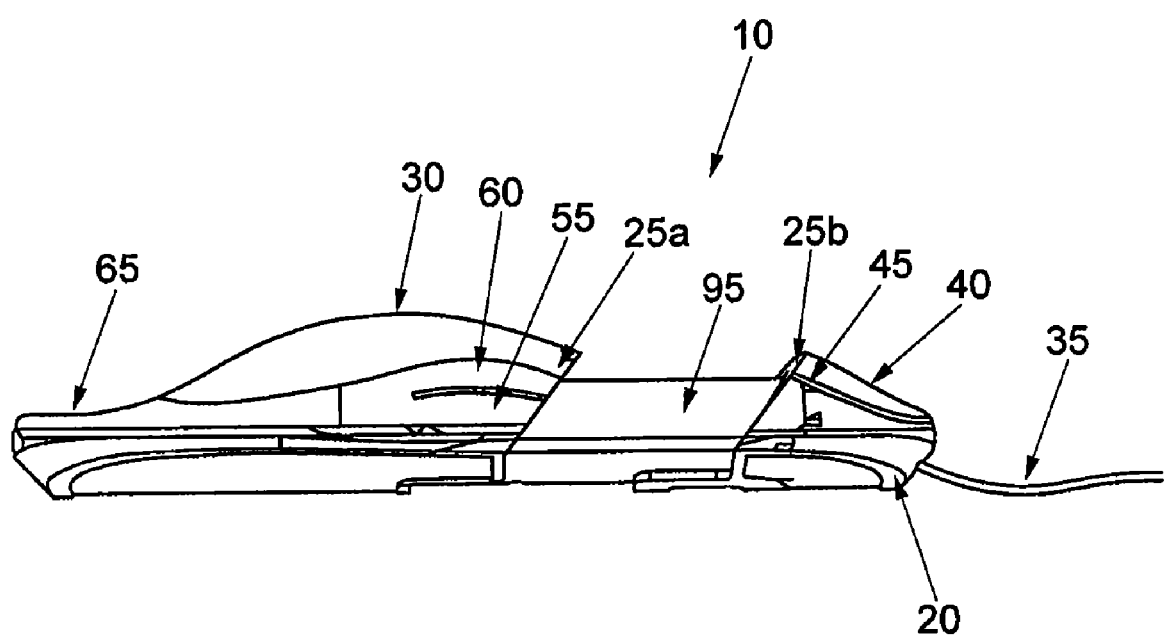
FIG. 17 is a side view of an ambidextrous ergonomic mouse according to a preferred embodiment of the present invention in an expanded position.

FIG. 17 is a side view of ambidextrous ergonomic mouse 10 according to a preferred embodiment of the present invention in an expanded position. Specifically, the view of FIG. 17 includes each of the components shown in FIG. 16. In addition, FIG. 17 shows front portion 20 and rear portion 30 separated, as well as rear edge 25b of front portion 20, front edge 25a of rear portion 30 and bridge member 95.

Desirably, bridge member 95 is fixed to rear edge 25b of front portion 20 and is slidably received by a cavity in rear portion 30 through an aperture in front edge 25a of rear portion 30. Bridge member 95 can be of substantially any shape, but it is preferred that bridge member 95 has a substantially rectangular cross-section. It is more preferred that the cross-section of bridge member 95 is a modified rectangle with its upper surface being curved. It is also preferred that the cavity (not shown) in rear portion 30 that receives bridge member 95 frictionally interacts with bridge member 95 so as to minimize changes in the extent of the extension of rear portion 30 from front portion 20.

According to the preferred embodiment of FIG. 17, ambidextrous ergonomic mouse 10 can be adjusted to most comfortably conform to the different sizes of different users' hands, particular in reference to hand length. The present invention thus envisions various modifications of ambidextrous ergonomic mouse 10, as shown in FIG. 17, for most comfortably adapting ambidextrous ergonomic mouse 10 to the length of a user's hand. For example, in a preferred embodiment, bridge member 95 can move continuously from the fully contracted position to the fully expanded position to allow for the largest number of length variants. In such embodiment, bridge member 95 may be sustained at any given length through friction locking, wherein the fit of bridge member 95 into a cavity in rear portion 30 through an aperture in front edge 25a of rear portion 30 is sufficiently snug to require some amount of force by the user to overcome the applied friction and thereby adjust.

According to another embodiment, bridge member 95 may include a series of grooves for interaction with a corresponding tab projecting into the cavity in rear portion 30, thereby allowing for incremental length adjustments. Other methods for adjusting and maintaining the level of expansion of bridge member 95, would be readily apparent to one of skill in the art and are thereby incorporated herein.

Further in accordance with the above embodiments, bridge member 95 could include a scale, such as a numbered scale, visible to the user on the top surface of bridge member 95. Such scale could be calibrated such that the scale corresponds to the length of a user's hand, thereby allowing a user to immediately adjust the length of ambidextrous ergonomic mouse 10 to the appropriate length for maximum ergonomic benefit without required trial and error.

Figure 18:
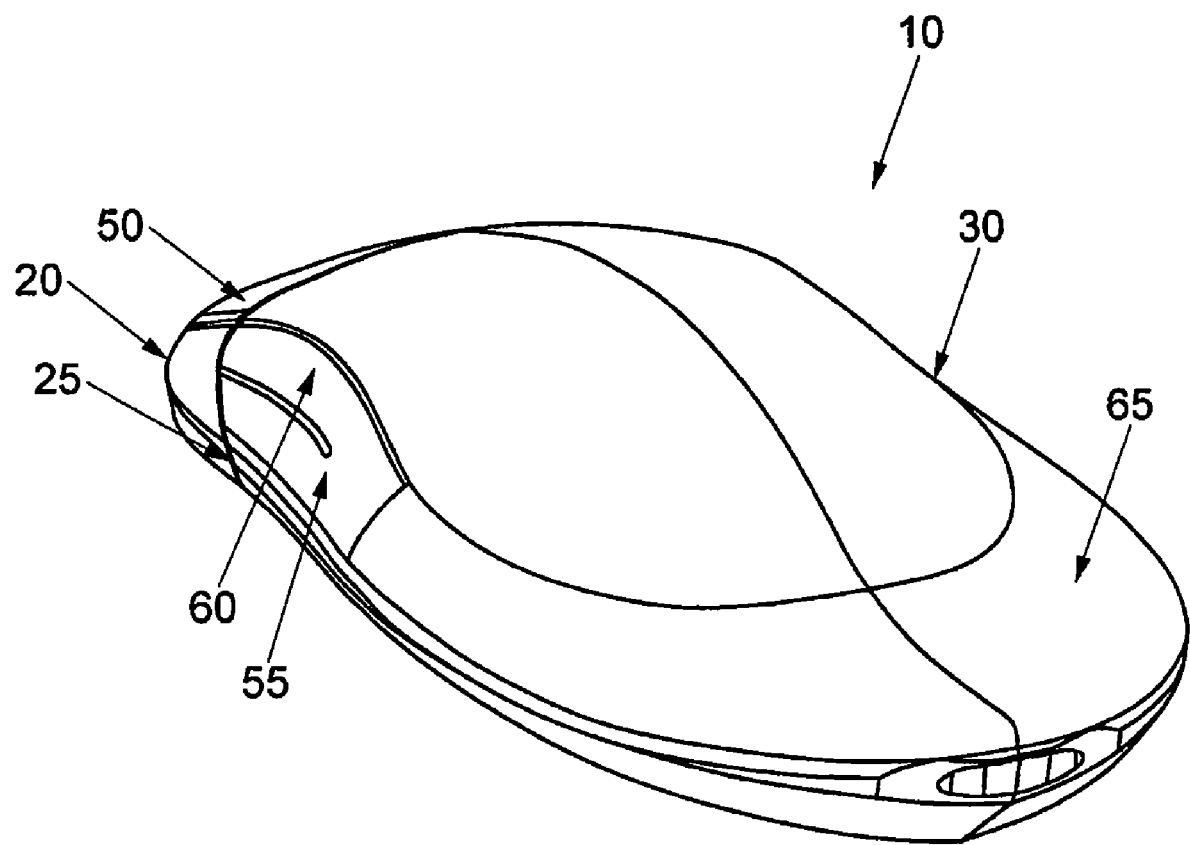
FIG. 18 is a rear perspective view of an ambidextrous ergonomic mouse according to a preferred embodiment of the present invention.

FIG. 18 is a rear prospective view of ambidextrous ergonomic mouse 10 according to a preferred embodiment of the present invention. In this view of ambidextrous ergonomic mouse 10, front portion 20 abuts rear portion 30 at intersection 25. Preferred palm rest 65 is shown in this view, as are left upper lateral button 60 and left lower lateral button 55 and left button 50.

Figure 19:
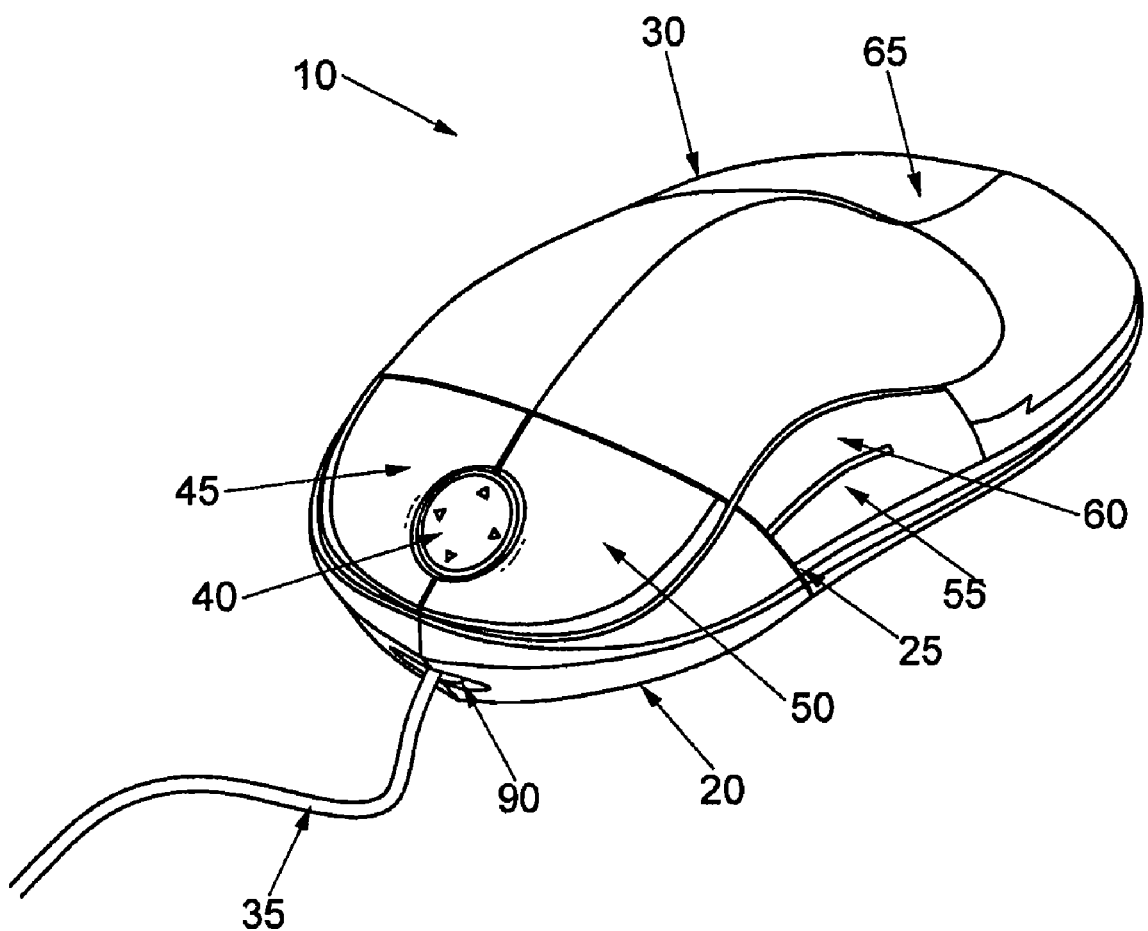
FIG. 19 is a front perspective view of an ambidextrous ergonomic mouse according to a preferred embodiment of the present invention.

FIG. 19 is a front prospective view of ambidextrous ergonomic mouse 10 according to a preferred embodiment of the present invention. In this view of ambidextrous ergonomic mouse 10, front portion 20 abuts rear portion 30 at intersection 25. Preferred palm rest 65 is shown in this view, as are left upper lateral button 60 and left lower lateral button 55 and left button 50, right button 45 and scroll device 40. Aperture 90, which is adapted for receiving communication link 35, is also seen in this view.

While scroll device 40 can be any conventional or non-conventional scroll device, such as a scroll wheel, it is preferred that scroll device 40 is similar to the "TrackPoint" device found on some models of the IBM ThinkPad laptop computer. Specifically, it is desired that movement of scroll device 40 is translated into movement of the computer's cursor. It is also desired that the force necessary for the user to move scroll device 40 is minimal, but sufficient to prevent scroll device 40 from moving without the user's input. It is desired that scroll device 40 is moved by a force of less than 1.0 N, and preferably less than 0.3 N.

Figure 20:
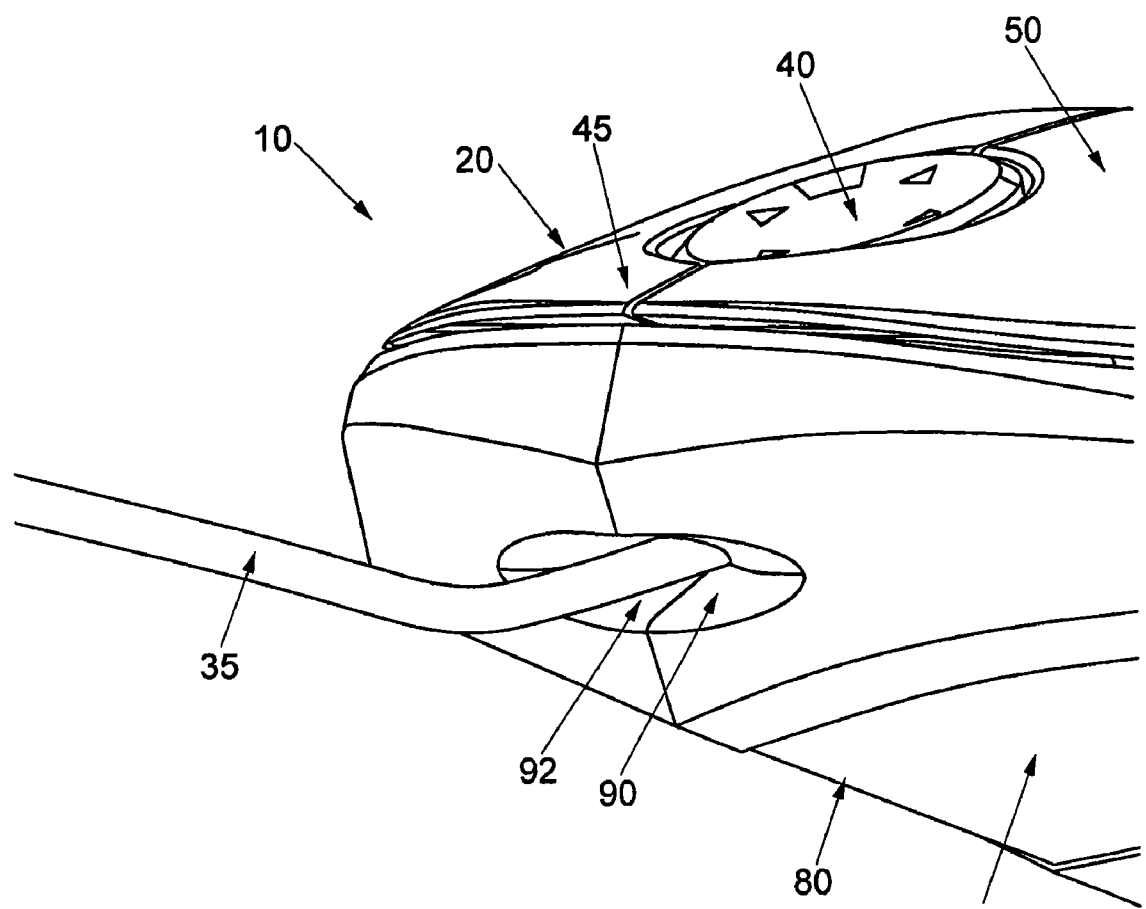
FIG. 20 is an enlarged front view of a portion of an ambidextrous ergonomic mouse according to a preferred embodiment of the present invention.

FIG. 20 is an enlarged front view of a portion of ambidextrous ergonomic mouse 10 according to a preferred embodiment of the present invention. Again, this view shows aperture 90, which is adapted for receiving communication link 35. This view also shows the angled shape of the bottom of ambidextrous ergonomic mouse 10, namely left bottom portion 85 and vertex 80. Additionally, FIG. 20 shows part of front portion 20 including right button 45, scroll device 40 and left button 50.

Figure 21:
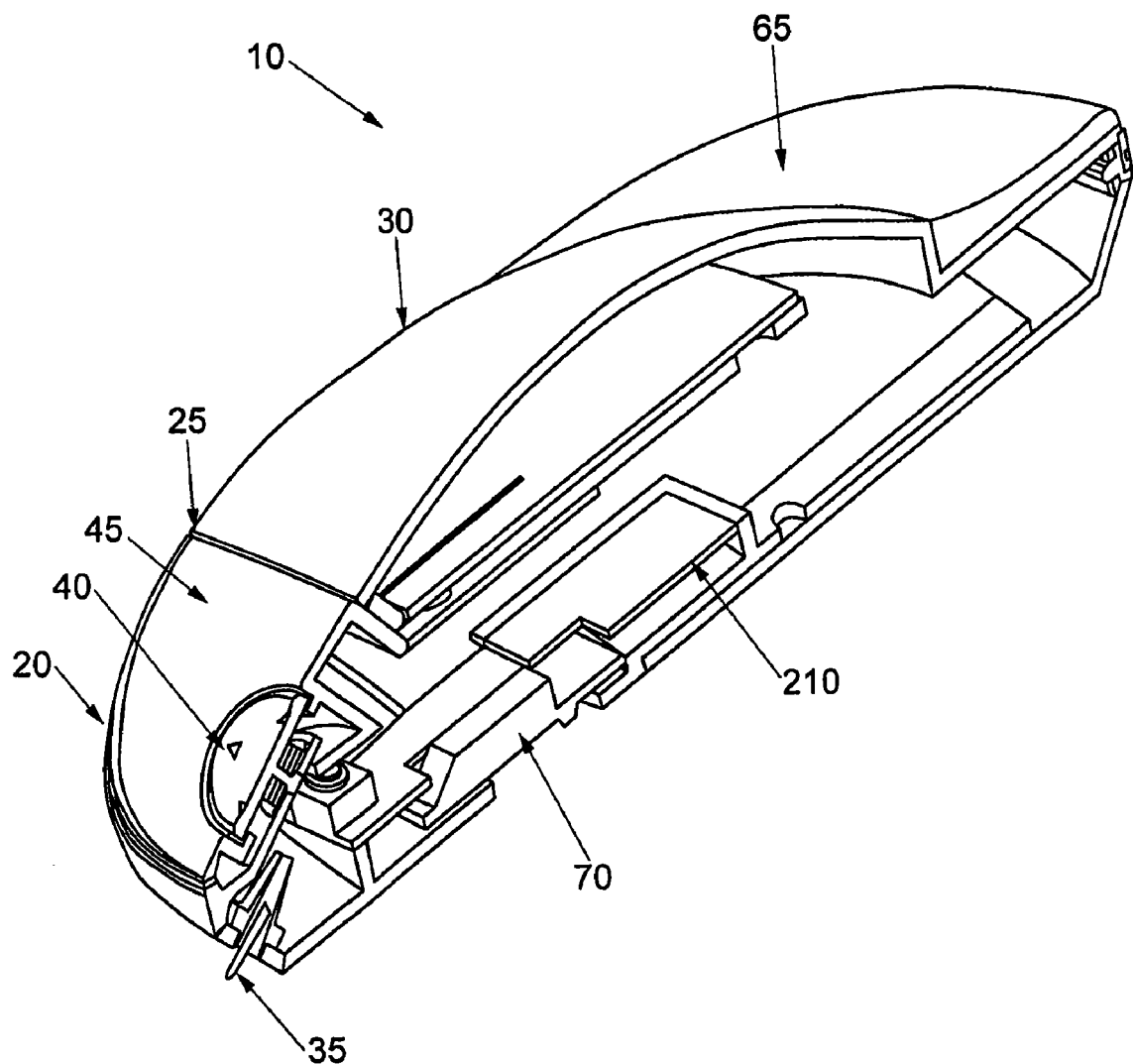
FIG. 21 is a sectional view of an ambidextrous ergonomic mouse according to a preferred embodiment of the present invention.

FIG. 21 is a sectional view of ambidextrous ergonomic mouse 10 according to a preferred embodiment of the present invention. More particularly, FIG. 21 shows front portion 20 in contact with rear portion 30 at intersection 25. FIG. 21 also shows right button 45 and scroll device 40 as well as communication link 35. Palm rest 65 is present on the rear of rear portion 30.

FIG. 21 shows optical sensor 70 and integrated circuit card 210 which accepts the inputs from the mouse movements and operation of the several buttons to prepare signals that are sent via communication link 35 to the computer associated with the mouse. While the figures illustrate a cable communication link, ambidextrous ergonomic mouse 10 of the present invention can accommodate any type of conventional communication link, such as infrared technology and radio frequency signals, for instance 2.4 MHz signals.

Figure 22:
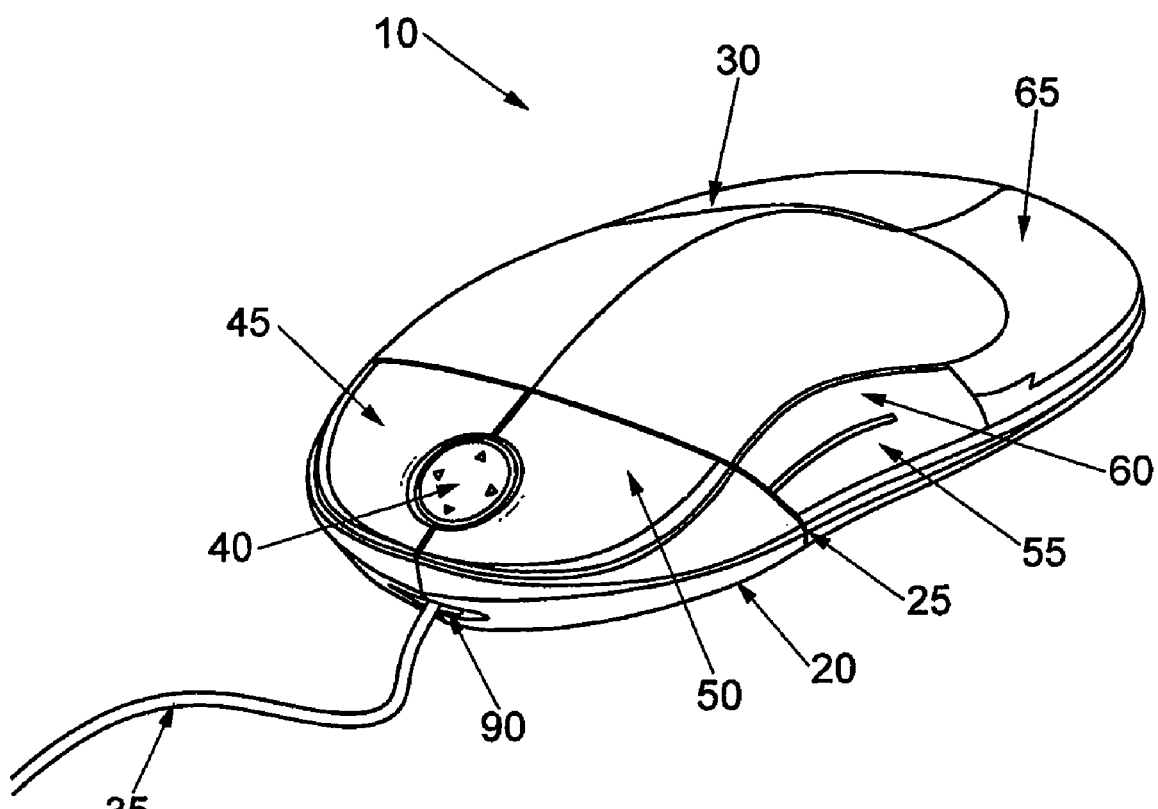
FIG. 22 is a front perspective view of an ambidextrous ergonomic mouse according to a preferred embodiment of the present invention.

FIG. 22 is a front prospective view of ambidextrous ergonomic mouse 10 according to a preferred embodiment of the present invention. Again, this embodiment includes front portion 20 and rear portion 30 which abut at intersection 25. Front portion 20 desirably includes communication link 35, aperture 90, right button 45, left button 50 and scroll device 40. Rear portion 30 includes upper lateral button 60 and lower lateral button 55 as well as palm rest 65.

Figure 23:
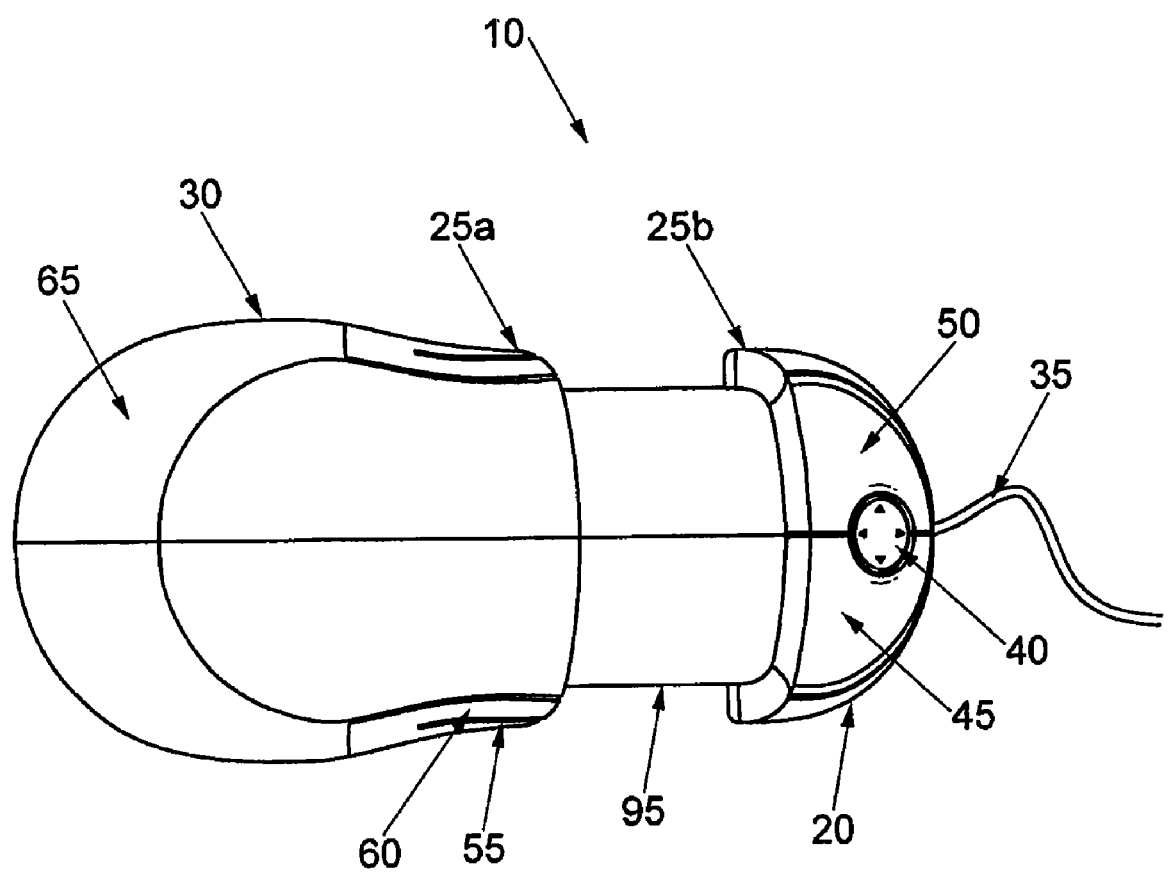
FIG. 23 is a top view of an ambidextrous ergonomic mouse according to a preferred embodiment of the present invention in an expanded position.

FIG. 23 is a top view of ambidextrous ergonomic mouse 10 according to a preferred embodiment of the present invention in an expanded position. In the embodiment shown in FIG. 23, front portion 20 and rear portion 30 do not abut. Rather, in this view, rear edge 25b of front portion 20 is separated from front edge 25a of rear portion 30, but front portion 20 is connected to rear portion 30 by bridge member 95.

Rear portion 30 of this preferred embodiment includes palm rest 65 as well as upper lateral button 60 and lower lateral button 55 while front portion 20 includes right button 45, left button 50 and scroll device 40. Additionally, the embodiment shown in FIG. 23 illustrates communication link 35 connecting the mouse to a computer (not shown).

Figure 24:
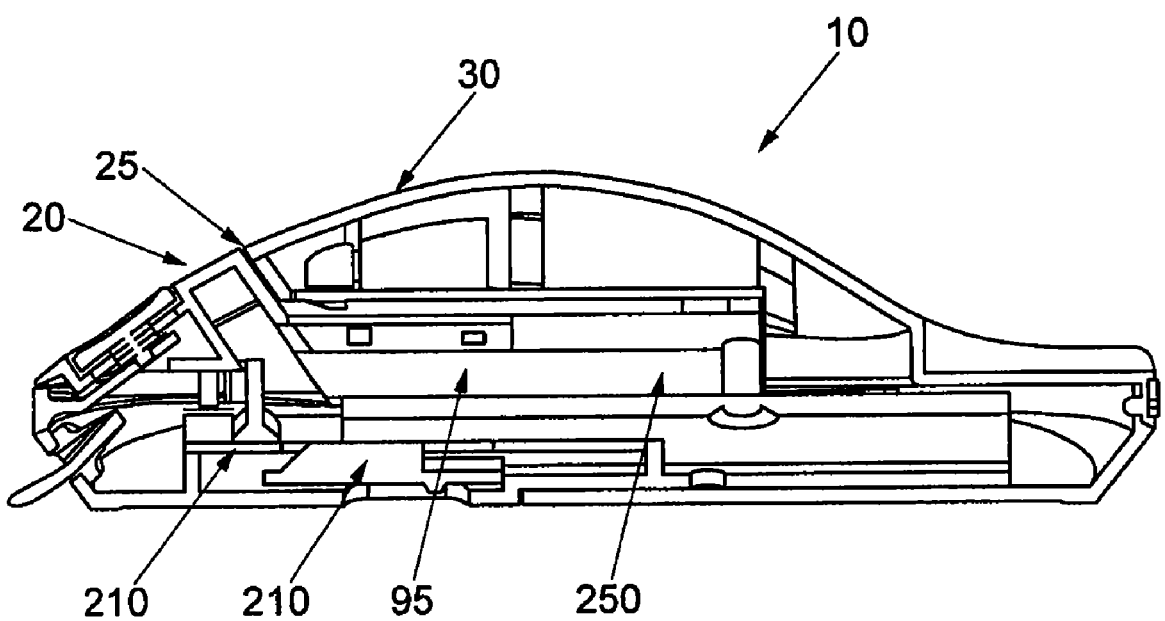
FIG. 24 is a cross-sectional view of an ambidextrous ergonomic mouse according to a preferred embodiment of the present invention in a retracted position.
Figure 25:
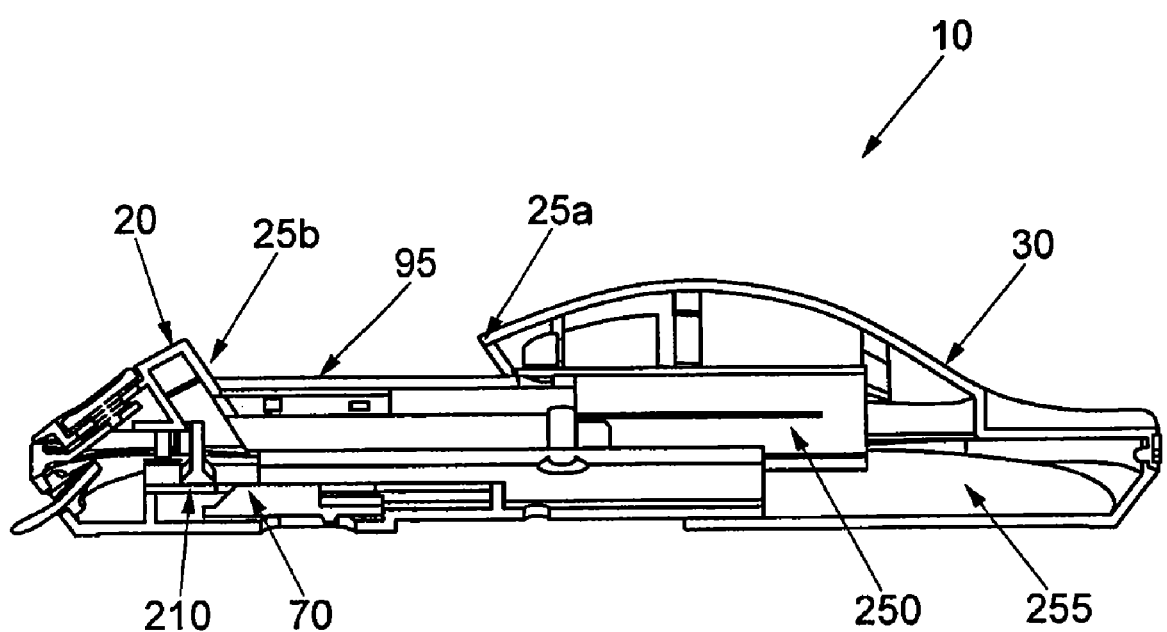
FIG. 25 is a cross-sectional view of an ambidextrous ergonomic mouse according to a preferred embodiment of the present invention in an expanded position.

FIGS. 24 and 25 show a cross-section of ambidextrous mouse 10 in both a fully retracted (FIG. 24) and an extreme extended (FIG. 25) position. Desirably, the length of the extension ranges from about zero inches for the fully retracted position to an extension of about four inches in the fully extended position.

In the fully retracted position, rear face 25b of front section 20 abuts forward face 25a of rear section 30 to form interface 25.

In FIG. 25, bridge member 95 is exposed in the extended ambidextrous ergonomic mouse 10. Desirably, bridge member 95 has a stop (not shown) that prevents bridge member 95 from sliding out of mouse bridge cavity 250 and 255. Typically, the stop is a projection from bridge member 95 that is restrained by an inner surface of forward face 25a of rear section 30.

In contrast to the view shown in FIG. 25, FIG. 24 shows mouse 10 in a retracted position. Here, bridge member 95 is within bridge cavity 250 and 255.

Both FIG. 24 and FIG. 25 show optical sensor 70 and integrated circuit card 210, which accepts the inputs from the mouse movements and operation of the several buttons to prepare signals that are sent via communication link 35 to the computer associated with the mouse.

Mouse motion sensing may also be performed by an optical system. One type of optical system generates pulses in response to changes in the reflection of light from a special mouse pad. Electrical pulses are produced as light is reflected either toward or away from photo sensors by grid lines in a reflective surface of the mouse pad. The photo sensors are aligned to detect either x or y movement of the mouse. In another optical mouse, a digital camera periodically photographs the surface over which the mouse is moved. A digital signal processor analyzes the series of images to determine the direction and extent of mouse movement.

A second function of an ambidextrous ergonomic mouse 10 is to signal the user's intent for the computer to initiate some function. The user signals intention to the computer by depressing or "clicking" one of the mouse buttons.

The function initiated by the PC in response to depression of a mouse button is determined by the software running on the computer. However, a click of the mouse button positioned for operation by the user's index finger typically causes the present position of the cursor on the display to be selected and the cursor to be activated. If a word processing program is running on the computer, the user can insert text or take some other action at the point designated by the cursor once the cursor is activated. If the user continues to depress the button while moving the mouse, an area of the displayed document is selected for some action. If a graphics program is running on the computer, a click of the button can be used to select a beginning point for a line or other graphic element. Moving the mouse while the button is depressed or "dragging" will cause the computer to "draw" the element.

To accommodate users of either handedness, the operating system may allow the user to reassign the mouse button function relationships for left- and right-hand mice. This permits users to retain a familiar relationship between the actuating finger and the function performed by the PC. It also allows assignment of the most dominant task (cursor selection) to the index finger without regard to the user's handedness. However, reassignment of the mouse button-function relationship typically requires knowledge of the operating system and the location of an operating system menu that controls the assignment. Users may not be sufficiently familiar with the operating system to perform this reassignment. This is particularly true in home or public applications where users are likely to have widely varying familiarity with the computers they are operating. Furthermore, concurrent users would likely find it awkward and inefficient to use this method to switch the handedness of the mouse. The present inventor concluded that a ftunction selector on the mouse would greatly facilitate the use of a mouse in those environments where one mouse is likely to be used by persons of either handedness.

Typically, a computer mouse includes a mouse microprocessor, which computes the movement of the mouse, determines the actuation state of the mouse buttons, and converts this information to a serial data stream which is transmitted to the attached computer. The mouse microprocessor includes a register to hold the logic level conversion of the mouse button actuation signals. Although a microprocessor is typical of a computer mouse, the mouse button actuation state could be determined by any logic device capable of converting the mouse actuation signal to a logic level and holding that level stable. References herein to a mouse microprocessor are understood to include other known logic devices capable of determining the actuation state of the mouse buttons.

In another aspect of the present invention there is provided an interface between cable link 35 and mouse 10. FIG. 20 shows that aperture 90 is substantially larger than communication link cable 30. Indeed, communication link cable 30 is held in place by membrane 92, which desirably is formed from an elastomer such as rubber. It is further desired that membrane 92 forms a substantially funnel shape aperture 90 with the diameter of aperture 90 being a multiple of at least 3 of the diameter of communication link cable 30. It is believed that this arrangement reduces the risk of injuring the cable connections when mouse 10 is moved between sharply different angles.

Figure 26:
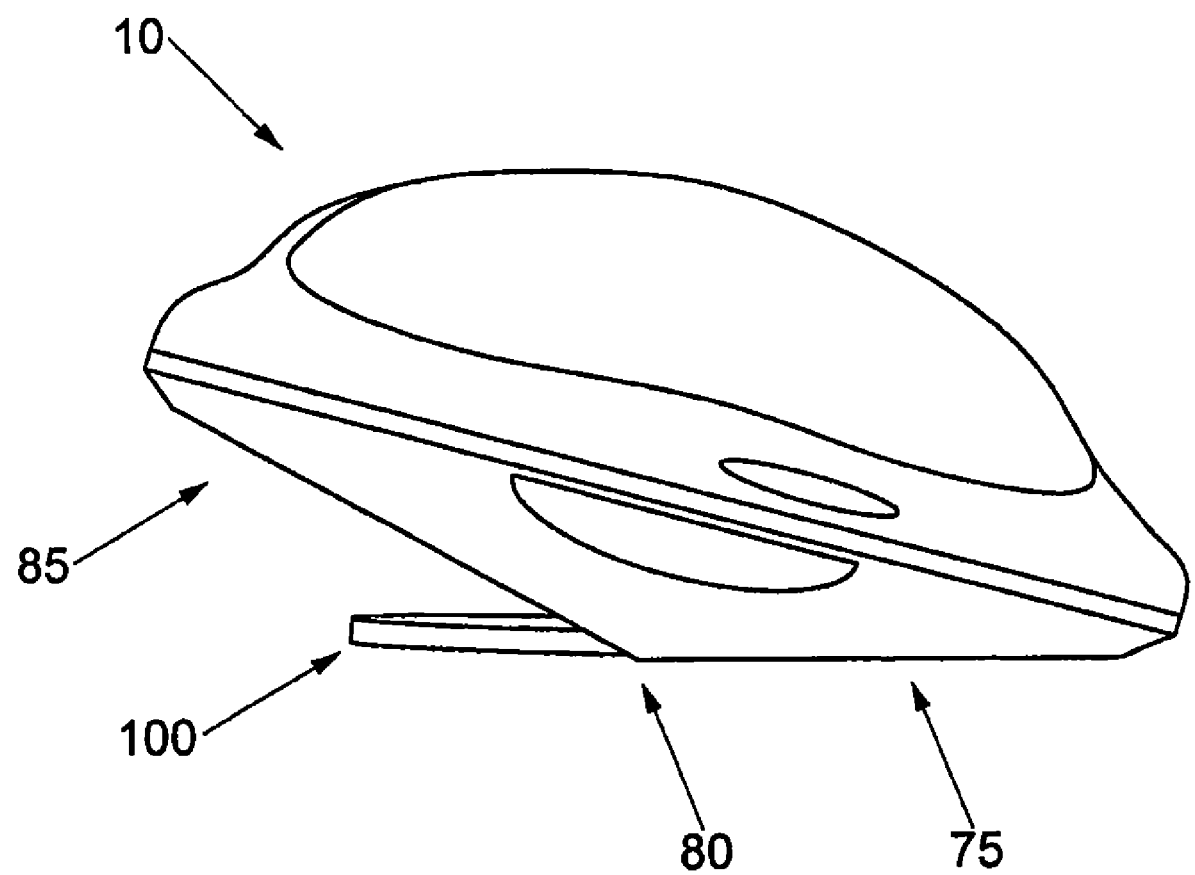
FIG. 26 is a rear view of an ambidextrous ergonomic mouse according to a preferred embodiment of the present invention in a position stabilized for use by a right-handed user.

Another preferred embodiment of the present invention is provided in FIG. 26, which shows a front view of an ambidextrous ergonomic mouse in a position stabilized for use by a right-handed user. According to this embodiment, ambidextrous ergonomic mouse 10 further comprises a support extension 100 for stabilizing ambidextrous ergonomic mouse 10 while resting on one of left bottom portion 85 or right bottom portion 75. As shown in FIG. 26, support extension 100 is positioned for stabilizing ambidextrous ergonomic mouse 10 while resting on right bottom portion 85 for use by a right-handed user.

Figure 27:
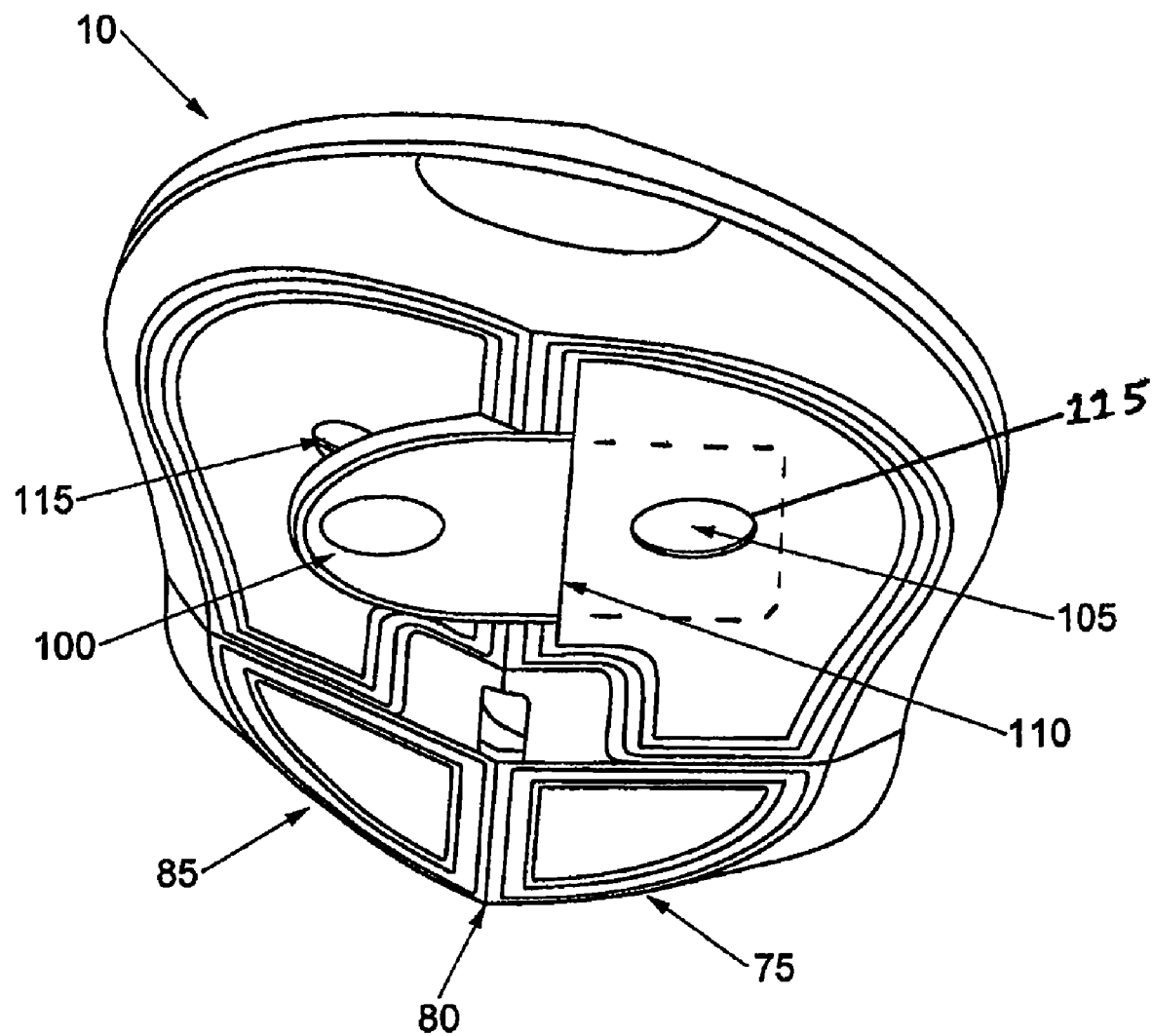
FIG. 27 is a rear bottom perspective view of an ambidextrous ergonomic mouse according to a preferred embodiment of the present invention showing a support extension for stabilization for right-handed use.

This embodiment is further illustrated in FIG. 27, which shows a bottom perspective view of ambidextrous ergonomic mouse 10 with support extension 100 positioned for use by a right-handed user. As can be seen in this view, ambidextrous ergonomic mouse 10 has a slotted opening 110 along a length of vertex 80 that extends partially into left bottom portion 85 and right bottom portion 75. Slotted opening 110 allows access to cavities in each of left bottom portion 85 and right bottom portion 75 for receiving a portion of support extension 100.

Preferably, ambidextrous ergonomic mouse 10 further includes a mechanism for securing support extension 100 inside the cavities in each of left bottom portion 85 and right bottom portion 75. According to the embodiment of FIG. 27, support extension 100 includes a tab 105 that has a thickened, rounded portion that interacts with an aperture 115 in either of left bottom portion 85 and right bottom portion 75. As shown in FIG. 27, the thickened, rounded portion of tab 105 is projecting through aperture 115 in right bottom portion 75. An identical aperture 115 is provided on left bottom portion 85. Support extension 100 can be inserted through slotted opening 110 into the cavity in one of left bottom portion 85 or right bottom portion 75. When the tab meets aperture 115, the thickened, rounded portion interacts with aperture 115, projecting into aperture 115 and effectively securing support extension 100 in place.

Figure 28:
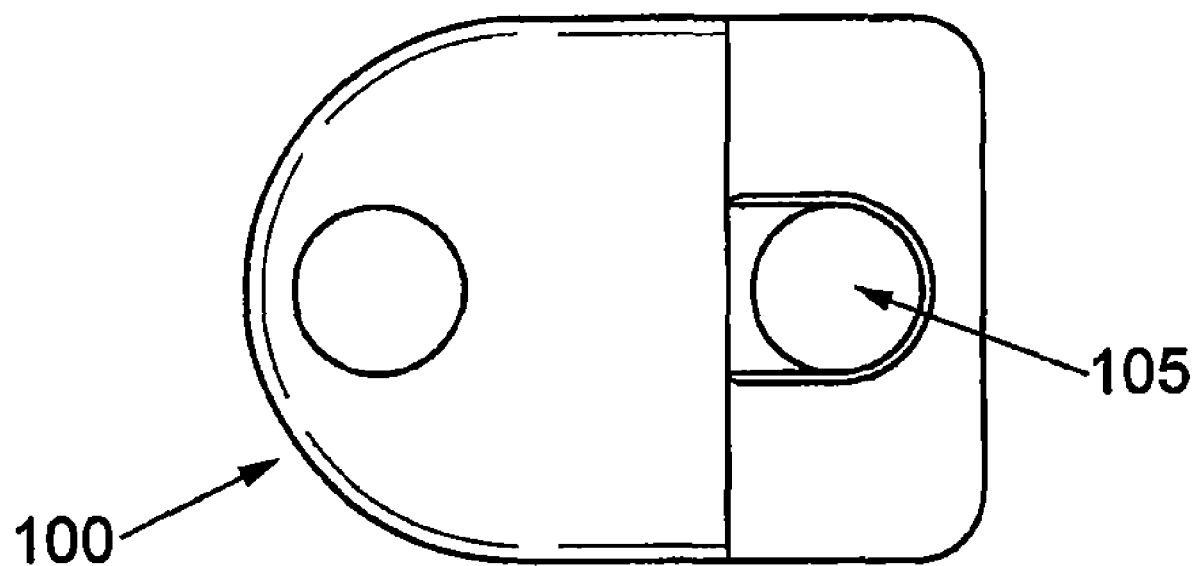
FIG. 28 is a top view of a support extension piece for use with an ambidextrous ergonomic mouse of the present invention for encouraging the mouse to tilt into a position for use by either a right-handed user or a left-handed user.

Preferentially, the tab is biased into the position of interacting with aperture 115. This can be accomplished through various methods. FIG. 28 shows one embodiment of support extension 100 wherein tab 105 can be manually pushed out of its home position being substantially in line with the plane of support extension 100. When the external force is removed, tab 105 naturally returns to its home position. In another embodiment, tab 105 can be biased into position with a spring mechanism inside the cavity in mouse 10 applying a downward force against at least a portion of support extension 100, preferentially against tab 105. Additional methods for biasing tab 105 into interaction with aperture 115 would be envisioned by one of skill in the art and are also encompassed by the present invention.

In another embodiment, support extension 100 may comprise two separate pieces that are retractable through slotted opening 110 into the cavities each of left bottom portion 85 and right bottom portion 75. In this embodiment, support extension 100 is preferably situated such that when fully retracted, it is flush with the surface of either left bottom portion 85 or right bottom portion 75. In this embodiment, support extension 100 can have a portion, such as a tab or widened end, that is internal to the cavity in each of left bottom portion 85 and right bottom portion 75 and prevents support extension 100 from being fully removed from the cavity (i.e. being retractable, but not removable). Other types of supports are also encompassed by the present invention and would be readily envisioned by one of skill in the art. For example, said support could also be a foldably retractable piece pivotally attached to left bottom portion 85 or right bottom portion 75, wherein the bottom portion further comprises a cutout section for receiving the extension flush with the surface of the bottom portion.

Figure 29:
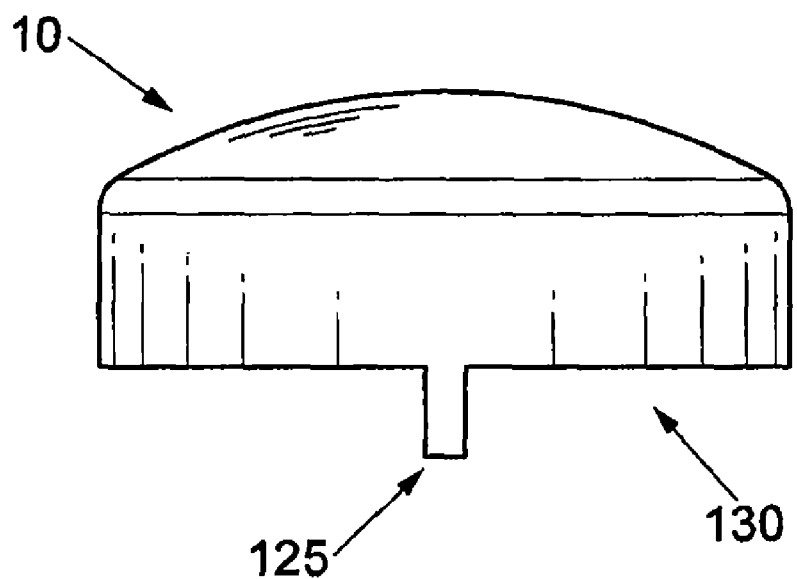
FIG. 29 is a rear view of an ambidextrous ergonomic mouse according to a preferred embodiment of the present invention having a base tilt wall for encouraging either a left-handed or right-handed position.

Another preferred embodiment of an ambidextrous ergonomic mouse according to the present invention is provided in FIG. 29, which shows a rear view of ambidextrous ergonomic mouse 10 having a base tilt wall 125 for encouraging ambidextrous ergonomic mouse 10 to tilt to the right or the left. In this embodiment, the base 130 of ambidextrous ergonomic mouse 10 is substantially flat. Base tilt wall 125 is a substantially linear wall having a vertical orientation and is preferentially attached to base 130 such that the vertical plane of base tilt wall 125 is perpendicular to the horizontal plane of base 130. Base tilt wall 125 has a thickness that is substantially small such that ambidextrous ergonomic mouse 10 can not remain balanced solely on the bottom edge of base tilt wall 125. Accordingly, ambidextrous ergonomic mouse 10 is encouraged to tilt either to the right or left. In this manner, ambidextrous ergonomic mouse 10 rests on a surface being supported by base tilt wall 125 and either the right or left edge of base 130 of ambidextrous ergonomic mouse 10. In one preferred embodiment, the right and/or left edge of base 130 is substantially flattened allowing a greater surface area of ambidextrous ergonomic mouse 10 to interact with the surface upon which it is resting. Further, the bottom portion of base tilt wall 125 can be flat, as shown in FIG. 29, or can be substantially V-shaped. When V-shaped, tilting to either the right or left is further encouraged. Additionally, the angle of the V-shaped bottom can be adjusted to correspond with the degree of tilt of ambidextrous ergonomic mouse 10 such that an increased surface area of base tilt wall 125 is available for interacting with the surface upon which ambidextrous ergonomic mouse 10 is resting.

Figure 30:
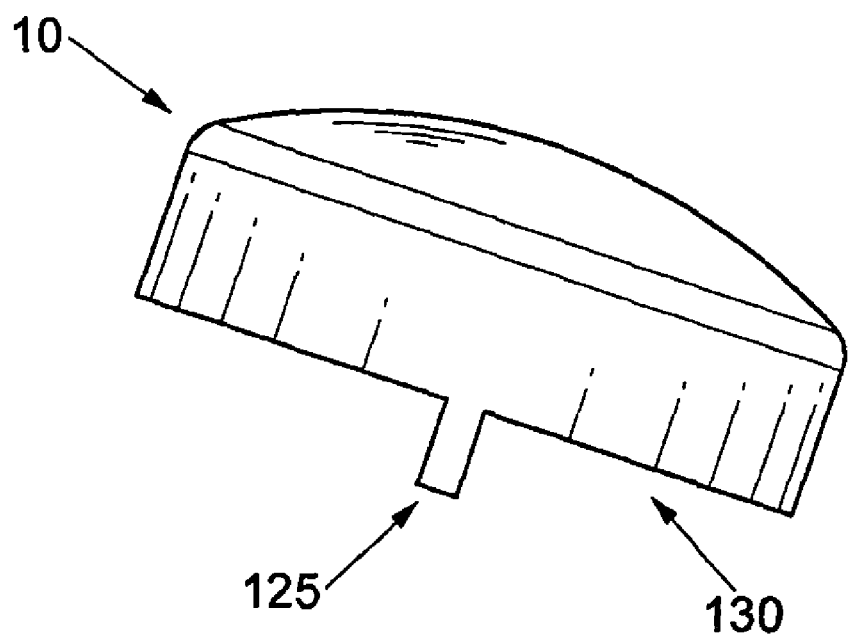
FIG. 30 is a rear view of an ambidextrous ergonomic mouse according to a preferred embodiment of the present invention having a base tilt wall and being tilted for use by a right-handed user.

FIG. 30 shows an ambidextrous ergonomic mouse according to the present invention having a base tilt wall 125 and being tilted to the right for use by a right-handed user. Accordingly, when resting on a surface, ambidextrous ergonomic mouse 10 is supported by base tilt wall 125 and the right edge of base 130.

Preferentially, base tilt wall 125 extends the entire length, from front to back, of base 130; however, the present invention also encompasses additional embodiments wherein base tilt wall 125 has a length that is less than the entire length of base 130. According to such embodiments, base tilt wall can extend along a partial length of base 130 being positioned substantially centered along the length of base 130. Similarly, it is desirable that base tilt wall 125 be centered across the width of base 130. This allows the degree of tilt to either side to be substantially identical. In another embodiment, though, the present invention encompasses an ambidextrous ergonomic mouse having a substantially flat base 130 and a base tilt wall 125 that is not centered across the width of base 130. By positioning base tilt 125 off center across the width of base 130, ambidextrous ergonomic mouse 10 will have a degree of tilt that is substantially greater to one side than to the other. For example, it may be ergonomically desirable for the degree of tilt to be greater for right-handed users than for left-handed users. Accordingly, base tilt wall 125 could be positioned to the right of center across base 130, which would increase the degree of tilt to the right and decrease the degree of tilt to the left. Similarly, if it was desirable for the degree of tilt to be greater to the left, base tilt wall 125 could be positioned to the left of center across base 130.

The degree of tilt of ambidextrous ergonomic mouse 10 is further controlled by the height of base tilt wall 125. The degree of tilt of mouse 10 can be increased by increasing the height of base tilt wall 125 and can be decreased by decreasing the height of base tilt wall 125. Preferentially, the height of base tilt wall 125 is sufficient such that it encourages a tilt of about 15° to about 80°, more preferably about 30° to about 60°, even more preferably about 45°. When base tilt wall 125 is centered across the width of base 130, the preferred degree of tilt is encouraged bilaterally. The degree of tilt of ambidextrous ergonomic mouse 10 will vary not only with the height of base tilt wall 125, but also with the width of base 130. Accordingly, for an ambidextrous ergonomic mouse having a base of a given width, it would be within the ability of one of skill in the art to determine an appropriate height for base tilt wall 125 to provide the desired degree of tilt of ambidextrous ergonomic mouse 10. For example, for an ambidextrous ergonomic mouse having a base width of about 7 cm, it would be desirable to provide a base tilt wall having a height of about 1 cm to about 3 cm. For an ambidextrous ergonomic mouse having a narrower base width, the minimum height of the base tilt wall would be less. Preferentially, the base tilt wall has a height of about 0.5 cm to about 5 cm.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A data input device comprising a housing enclosing, in operative connection, a motion detector, a motion detector transducer, and a communication link, said housing comprising:
   a. an upper surface adapted to support a user's palm;
   b. a lower surface comprising two planar regions, said lower surface adapted to tilt the housing bilaterally at an angle that substantially supports a user's hand in a position of function in use; and
   c. wherein at least one of said planar regions of said lower surface further comprises a support extension.

2. The data input device of claim 1, wherein said two planar regions intersect at an angle of between about 120° and 175°.

3. The data input device of claim 2, wherein said housing further comprises a chamber at one end.

4. The data input device of claim 3, further comprising a movable body having a projection adapted to slide within said chamber in said housing.

5. The data input device of claim 4, wherein said projection frictionally engages an inner surface of said chamber.

6. The data input device of claim 4, further comprising a locking mechanism for securing said projection.

7. The data input device of claim 4, wherein said projection has a length of up to about 4 inches.

8. The data input device of claim 1, wherein said two planar regions intersect at an angle of between about 130° and 150°.

9. The data input device of claim 1, wherein said housing further comprises a first end having two switch operating buttons.

10. The data input device of claim 1, wherein said housing further comprises a side having two switch operating buttons positioned on above the other.

11. The data input device of claim 1, wherein said housing further comprises a scroll device.

12. The data input device of claim 11, wherein said scroll device is capable of directing movement in four directions.

13. The data input device of claim 11, wherein the force required to move said scroll device is less than about 1.0 N.

14. The data input device of claim 13, wherein the force required to move said scroll device is less than about 0.3 N.

15. The data input device of claim 1, wherein said motion detector is selected from the group consisting of optical motion sensors, mechanical motion sensors, optical-mechanical motion sensors, and wireless motion sensors.

16. The data input device of claim 1, wherein at least one of said planar regions of said lower surface further comprises a slot for receiving said extension.

17. The data input device of claim 1, wherein said support extension further comprises a tab for securing said support extension.

18. The data input device of claim 17, wherein at least one of said planar regions of said lower surface further comprises an aperture for receiving at least a portion of said tab.

19. The data input device of claim 1, wherein said housing further comprises a first end having two switch operating buttons.

20. The data input device of claim 1 wherein said housing further comprises a side having two switch operating buttons position one above each other.

21. The data input device of claim 1, wherein said housing further comprises:
   a. a first end having two switch operating buttons; and
   b. a side having two switch operating buttons positioned one above the other.

22. The data input device of claim 1, wherein said housing further comprises a chamber at one end.

23. The data input device of claim 22, further comprising a movable body having a projection adapted to slide within said chamber in said housing while frictionally engaging an inner surface in said chamber, said projection being between about zero and about four inches in length.

24. A data input device housing comprising:
   a. an upper part having a mound region, a button region, and a shelf region, said shelf region being distal to said button region; and
   b. a lower part adapted to tilt the housing bilaterally, said lower part comprising two planar regions, wherein at least one of said planar regions of said lower surface further comprises a support extension.

25. The data input device of claim 24, wherein said two planar regions intersect at an angle of between about 120° and 175°.

26. The data input device housing of claim 25, further comprising a chamber at one end.

27. The data input device housing of claim 26, further comprising a movable body having a projection adapted to slide within said chamber in said housing while frictionally engaging an inner surface in said chamber, said projection being between about zero and about four inches in length.

28. An X-Y input device, which is moved on a surface to an intended position to sense relative X and Y coordinates of the position and output corresponding signals to the central processor, having a body casing including a bottom member, said bottom member adapted to tilt the housing bilaterally at an angle that substantially supports a user's hand in a position of function in use, said bottom member comprising two planar regions, wherein at least one of said planar regions of said lower surface further comprises a support extension.

29. A housing for a data input device, comprising:
   a. an upper surface adapted to support a user's palm;
   b. a v-shaped bottom surface attached to the upper surface and comprising two planar regions; and
   c. a support extension attached to the v-shaped bottom surface.

30. The housing of claim 29, wherein the bottom surface further comprises a slot allowing access to an internal cavity of the housing.

31. The data input device of claim 30, wherein at least one of the two planar regions further comprises an aperture, and wherein the support extension further comprises a tab capable of engaging the aperture to releasably attach the support extension to the bottom surface.

32. The data input device of claim 30, wherein the support extension is at least partially inserted into the bottom surface's slot to allow the tab to engage the aperture from within the housing's internal cavity.

* * * * *